(12) United States Patent
Engels et al.

(10) Patent No.: US 9,969,427 B1
(45) Date of Patent: May 15, 2018

(54) TRANSPORT CONVERSION MODE

(71) Applicant: Wirtgen GmbH, Windhagen (DE)

(72) Inventors: Michael Engels, Obererbach (DE);
Christian Liss, Meckenheim (DE);
Cyrus Barimani, Königswinter (DE)

(73) Assignee: Wirtgen GmbH (DE)

( * ) Notice: Subject to any disclaimer, the term of this patent is extended or adjusted under 35 U.S.C. 154(b) by 0 days. days.

(21) Appl. No.: 15/352,718

(22) Filed: Nov. 16, 2016

(51) Int. Cl.
*E01C 19/48* (2006.01)
*B62D 11/20* (2006.01)

(52) U.S. Cl.
CPC ............. *B62D 11/20* (2013.01); *E01C 19/48* (2013.01); *E01C 19/4893* (2013.01); *E01C 2301/00* (2013.01)

(58) Field of Classification Search
CPC ...... E01C 19/48; E01C 19/4893; E01C 19/42; E01C 2301/00; B62D 11/20; B62D 7/15; B62D 55/065; B62D 55/084; G05D 1/08
See application file for complete search history.

(56) References Cited

U.S. PATENT DOCUMENTS

| | | |
|---|---|---|
| 3,664,448 A | 5/1972 | Hudis |
| 3,751,174 A | 8/1973 | Layton |
| 3,792,745 A | 2/1974 | Files |
| 3,970,405 A | 7/1976 | Swisher, Jr. et al. |
| 4,029,165 A | 6/1977 | Miller et al. |
| 4,360,293 A | 11/1982 | Wade |
| 4,789,266 A | 12/1988 | Clarke, Jr. et al. |
| 4,900,186 A * | 2/1990 | Swisher, Jr. ............ E01C 19/48 404/104 |
| 5,135,333 A | 8/1992 | Guntert, Sr. et al. |
| 5,590,977 A | 1/1997 | Guntert et al. |
| 5,615,972 A | 4/1997 | Guntert et al. |

(Continued)

FOREIGN PATENT DOCUMENTS

| | | |
|---|---|---|
| DE | 19814052 A1 | 10/1999 |
| EP | 0893539 A1 | 1/1999 |

(Continued)

OTHER PUBLICATIONS

European Search Report for corresponding European Patent Application No. 17 20 1392 dated Feb. 12, 2018, 11 pages (not prior art).

*Primary Examiner* — Abigail A Risic
(74) *Attorney, Agent, or Firm* — Lucian Wayne Beavers; Patterson Intellectual Property Law, PC

(57) ABSTRACT

A self-propelled paving machine includes a plurality of swing legs, each swing leg being supported from a ground surface by an associated crawler track steerably connected to an outer end of its associated swing leg. The machine may be re-oriented from a paving orientation to a transport orientation via a transport conversion mode of an automatic controller configured to spin the paving in place on the ground through a re-orientation angle, then rotate each of the crawler tracks relative to its respective swing leg until each crawler track is primarily oriented in a transport direction generally perpendicular to the paving direction, and then while moving the paving machine in the transport direction pivoting each of the swing legs relative to the frame until each swing leg is oriented primarily in the transport direction. The paving machine may then be driven onto a transport vehicle.

27 Claims, 22 Drawing Sheets

(56) References Cited

U.S. PATENT DOCUMENTS

| | | | |
|---|---|---|---|
| 6,106,073 A | 8/2000 | Simons et al. | |
| 6,390,728 B1 | 5/2002 | Casters | |
| 6,471,442 B1 | 10/2002 | Deeb et al. | |
| 6,481,923 B1 | 11/2002 | Casters | |
| 6,692,185 B2 | 2/2004 | Colvard | |
| 6,773,203 B2 | 8/2004 | Casters | |
| 6,872,028 B2 | 3/2005 | Aeschlimann et al. | |
| 6,890,123 B2 | 5/2005 | Piccoli | |
| 7,287,931 B2 | 10/2007 | Anibaldi et al. | |
| 7,523,995 B2 | 4/2009 | Rio et al. | |
| 7,942,604 B2 | 5/2011 | Willis et al. | |
| 8,118,518 B2 | 2/2012 | Guntert, Jr. et al. | |
| 8,459,898 B2 | 6/2013 | Guntert, Jr. et al. | |
| 9,388,537 B2 | 7/2016 | Dahm et al. | |
| 9,388,538 B2 | 7/2016 | Dahm et al. | |
| 9,388,539 B2 | 7/2016 | Dahm et al. | |
| 9,551,115 B2 * | 1/2017 | Engels | G06T 7/20 |
| 9,663,162 B1 * | 5/2017 | Pedersen | B62D 55/084 |
| 9,764,762 B2 * | 9/2017 | Klein | B62D 11/20 |
| 2003/0180092 A1 | 9/2003 | Piccoli | |
| 2005/0249554 A1 | 11/2005 | Anibaldi et al. | |
| 2010/0021234 A1 * | 1/2010 | Willis | B62D 7/026 404/90 |
| 2011/0194898 A1 | 8/2011 | Guntert, Jr. et al. | |
| 2011/0236129 A1 | 9/2011 | Guntert, Jr. et al. | |
| 2014/0054950 A1 | 2/2014 | Berning et al. | |
| 2015/0083517 A1 * | 3/2015 | Farr | B62D 7/02 180/414 |
| 2015/0354148 A1 | 12/2015 | Dahm et al. | |
| 2015/0354149 A1 | 12/2015 | Dahm et al. | |
| 2015/0354150 A1 | 12/2015 | Dahm et al. | |
| 2016/0137242 A1 | 5/2016 | Dahm et al. | |
| 2016/0244096 A1 * | 8/2016 | Klein | B62D 11/20 |
| 2017/0344027 A1 | 11/2017 | Dahm et al. | |

FOREIGN PATENT DOCUMENTS

| | | |
|---|---|---|
| EP | 1596006 A1 | 11/2005 |
| EP | 3023544 A1 * | 5/2016 |
| WO | 2008042244 A2 | 4/2008 |

* cited by examiner

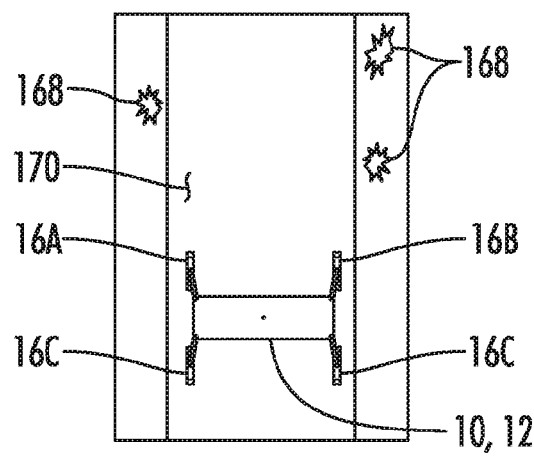
FIG. 4.1
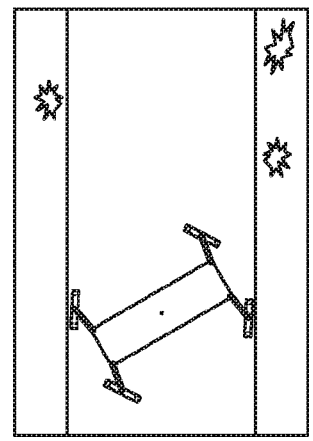
FIG. 4.4
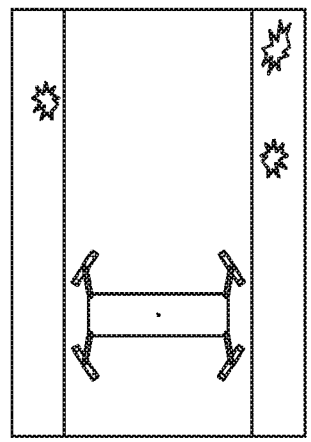
FIG. 4.2
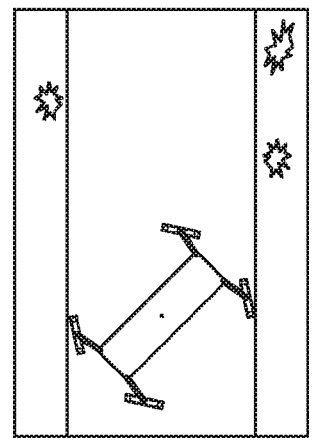
FIG. 4.5
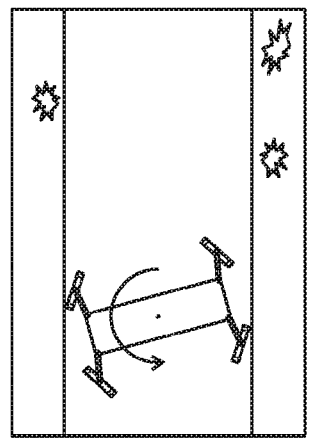
FIG. 4.3
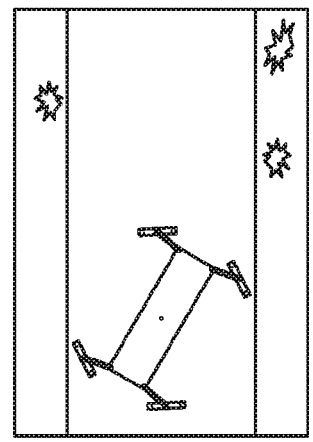
FIG. 4.6

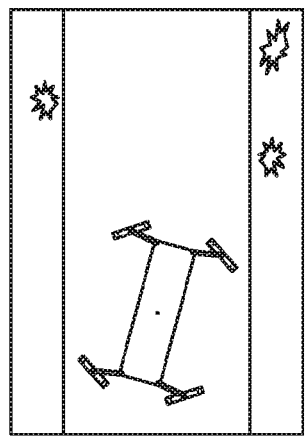
FIG. 4.7
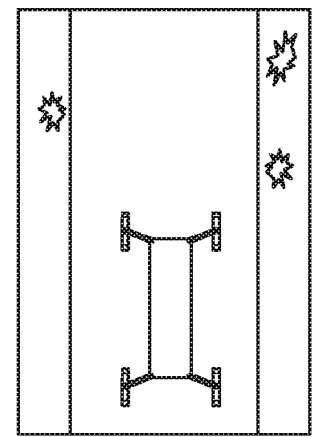
FIG. 4.10
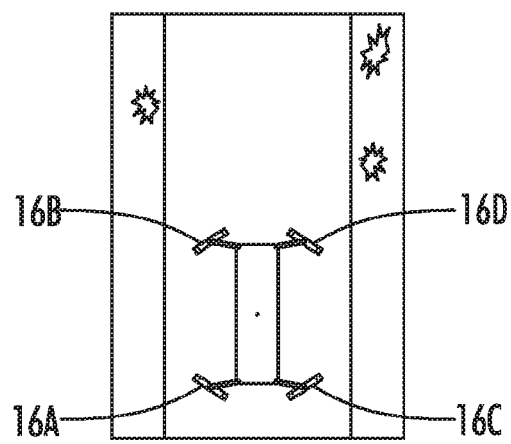
FIG. 4.8
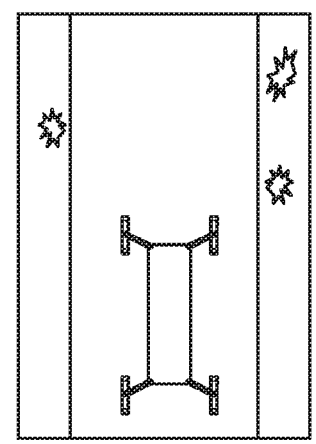
FIG. 4.11
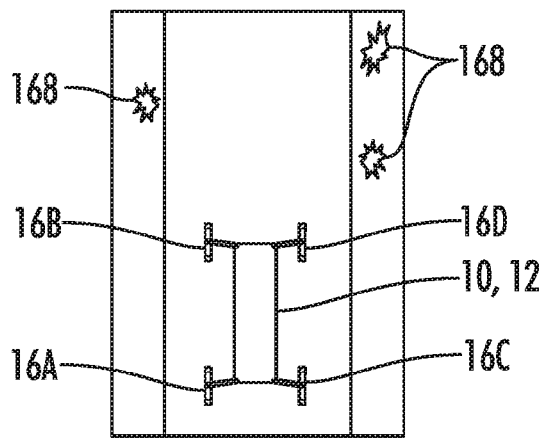
FIG. 4.9
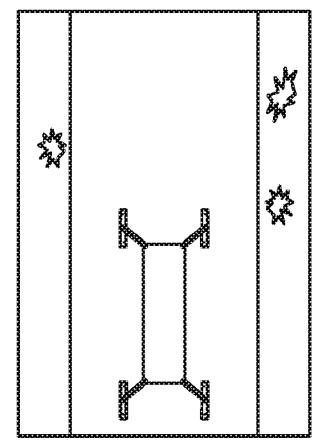
FIG. 4.12

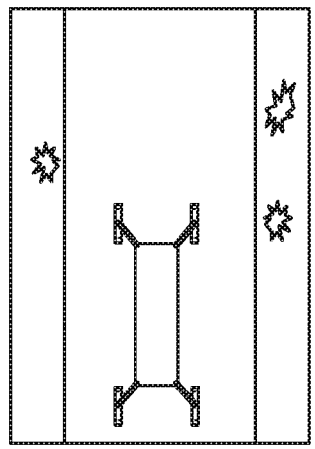
FIG. 4.13
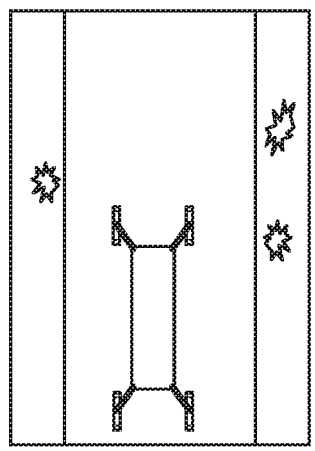
FIG. 4.14
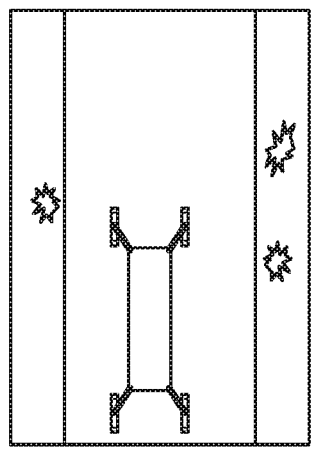
FIG. 4.15
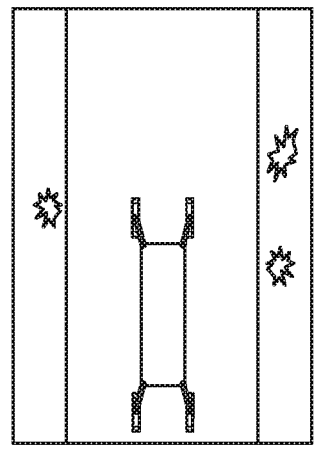
FIG. 4.16
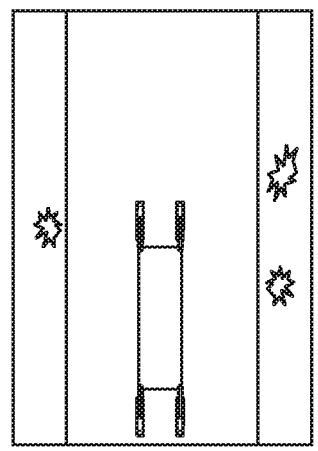
FIG. 4.17
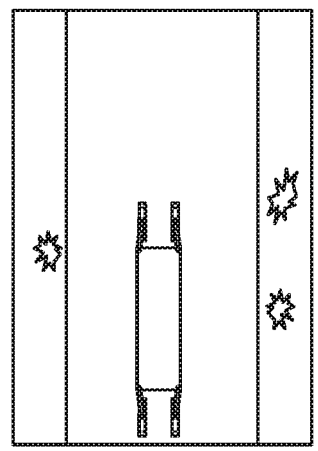
FIG. 4.18

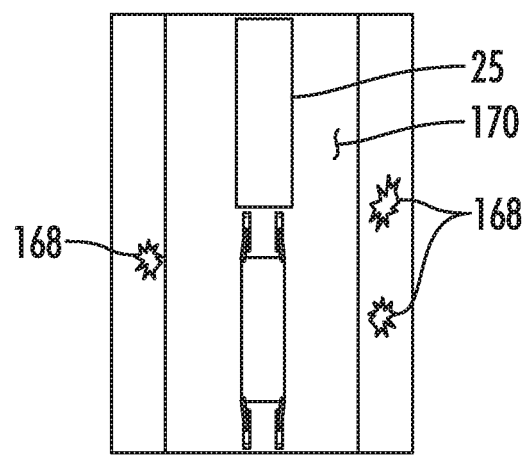
FIG. 4.19

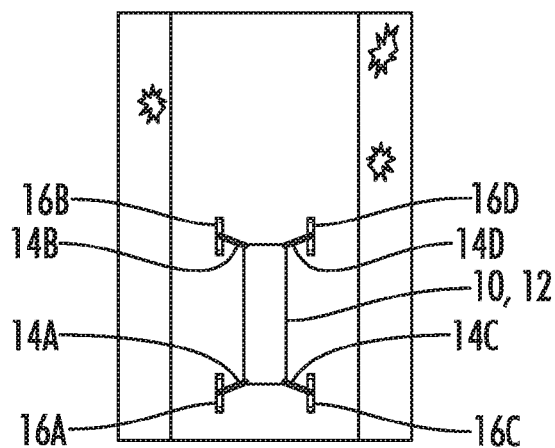
FIG. 6.1
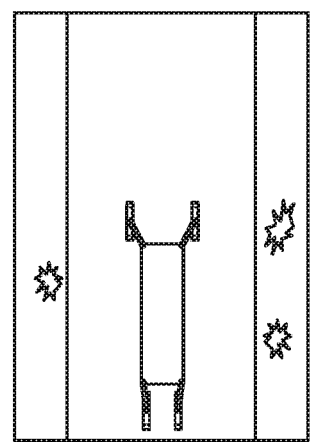
FIG. 6.4
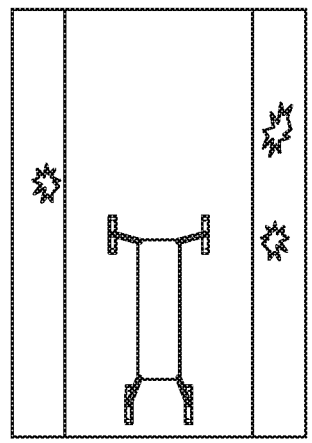
FIG. 6.2
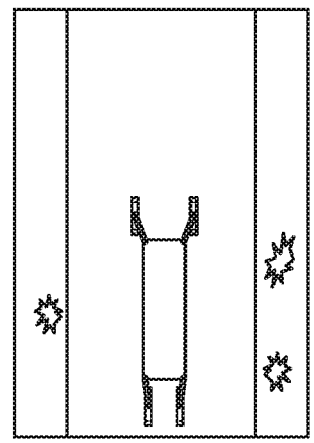
FIG. 6.5
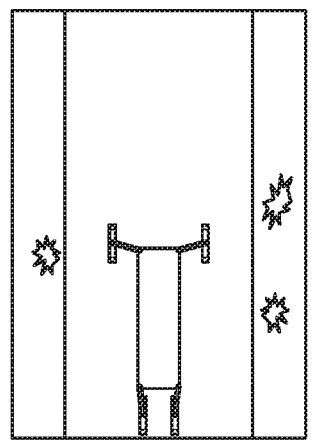
FIG. 6.3
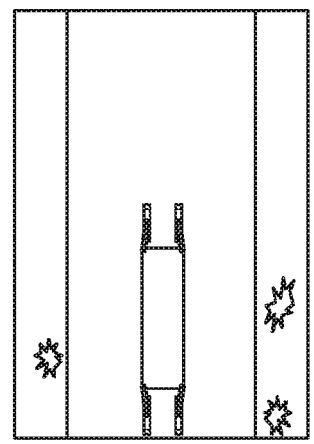
FIG. 6.6

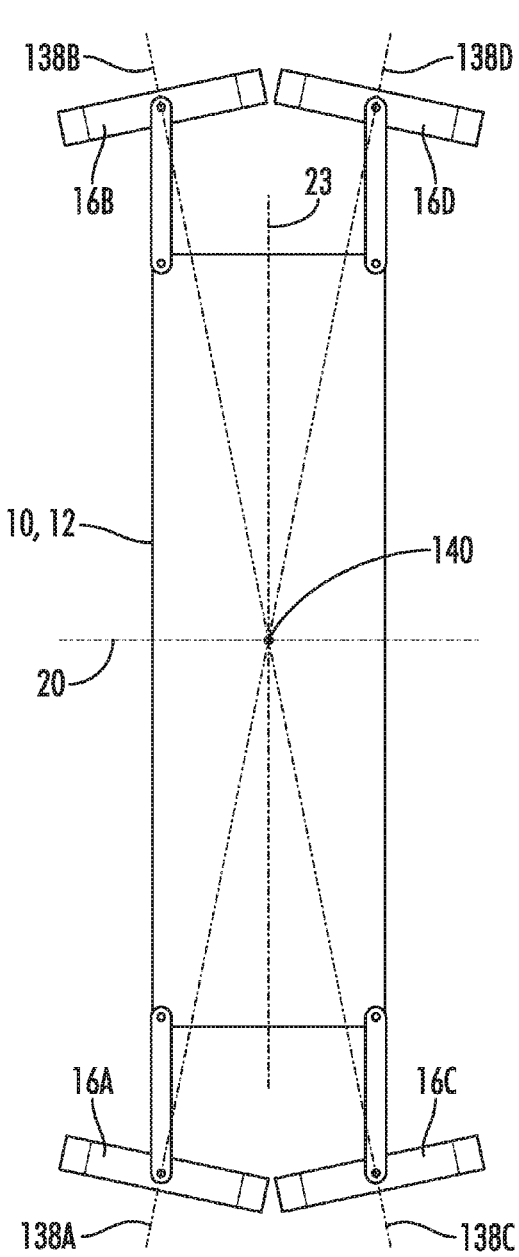
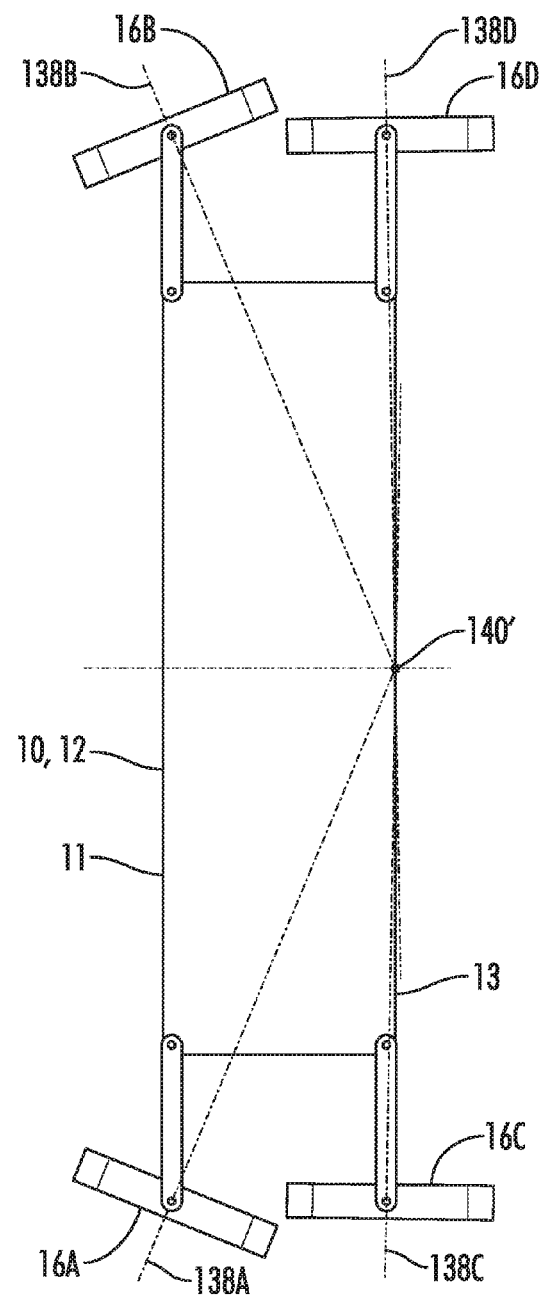
*FIG. 11A*  *FIG. 11B*

TRANSPORT CONVERSION MODE

BACKGROUND OF THE INVENTION

1. Field of the Invention

The present invention relates to methods and apparatus for operating self-propelled construction machines, and more particularly, but not by way of limitation, to methods and apparatus for operating slipform paving machines.

2. Description of the Prior Art

One known arrangement for a self-propelled construction machine includes a generally rectangular machine frame having a swing leg mounted at each corner of the frame and having a crawler track mounted at the free end of each swing leg. The crawler tracks provide the motive force for the construction machine. The mounting of the crawler tracks on the swing legs allows the crawler tracks to be repositioned in a horizontal plane relative to the machine frame for various reasons. For example, a slipform paving machine utilizing such construction may need to spread the forward extending swing legs in order to make room for a paving kit or other equipment supported from the machine frame. Also, it may be desirable during operation of the machine to relocate one or more of the swing legs and its associated crawler track to avoid obstacles. Also, the swing legs allow the crawler tracks to be repositioned for transport of the construction machine.

Various systems have been proposed for repositioning of the swing legs relative to the machine frame for transport of the construction machine.

One system set forth in Swisher U.S. Pat. No. 3,970,405 provides that each track is individually raised off of the ground surface one at a time, and then the swing leg is manually pivoted to the desired orientation where it is fixed in place using turn buckles. The transport position of the Swisher machine is shown in its FIG. 2. Disadvantages of this system include the need to individually raise each track off the ground one at a time, and the need to realign the steering after adjusting the leg orientation.

Another approach is found in Aeschlimann U.S. Pat. No. 6,872,028 in which the swing legs are constructed as parallelogram linkages mounted on a mounting bracket. The entire mounting bracket and parallelogram linkage can be pivoted 90 degrees for transport as shown in FIG. 16 of Aeschlimann.

Another solution is provided in Guntert U.S. Pat. No. 8,459,898. Each crawler track is steerable through a steering angle of 90 degrees relative to its swing leg. As shown in Guntert FIGS. 8A-8E, with the track oriented at 90 degrees to the swing leg, the track is advanced to pivot the swing leg through a pivot angle of 90 degrees to a transport position. Guntert pivots its swing legs one at a time from the paving orientation to the transport orientation, while the machine frame remains in a fixed position on the ground.

Thus there is a continuing need for improvements in the arrangements for the control of the pivoting of swing legs of such automotive construction machines to reorient the swing legs to a transport position.

SUMMARY OF THE INVENTION

In one embodiment a method is provided for preparing a paving machine for transport. The paving machine may include a frame including a rear and a front, the frame defining a paving direction extending from the rear to the front and a transport direction perpendicular to the paving direction, a plurality of swing legs pivotally connected to the frame, and a plurality of ground engaging units, one ground engaging unit being steerably connected to each one of the swing legs, each of the ground engaging units including a drive such that the ground engaging unit may be driven across the ground. The method may include steps of: (a) spinning the frame in place on the ground through a re-orientation angle; (b) after step (a), rotating each of the ground engaging units relative to its respective swing leg until each ground engaging unit is oriented primarily in the transport direction; and (c) while moving the paving machine in the transport direction, pivoting each of the swing legs relative to the frame until each swing leg is oriented primarily in the transport direction.

In another embodiment a paving machine may include a frame including a rear and a front, the frame defining a paving direction extending from the rear to the front, a plurality of swing legs pivotally connected to the frame, and a plurality of ground engaging units, one ground engaging unit being steerably connected to each one of the swing legs, each of the ground engaging units including a drive such that the ground engaging unit may be driven across the ground. The paving machine may include an automatic controller having a transport conversion mode configured to: (a) cause the frame to spin in place on the ground through a re-orientation angle; (b) then rotate each of the ground engaging units relative to its respective swing leg until each ground engaging unit is oriented primarily in a transport direction of the frame generally perpendicular to the paving direction of the frame; and (c) move the paving machine in the transport direction, and while moving in the transport direction pivot each of the swing legs relative to the frame until each swing leg is oriented primarily in the transport direction.

In step (a) the re-orientation angle may be substantially 90 degrees.

Step (a) may be performed without pivoting any of the swing legs relative to the frame during the spinning.

Step (a) may further include steps of: beginning with the frame in a paving orientation with the swing legs and the ground engaging units oriented primarily in the paving direction; rotating each of the ground engaging units relative to its respective swing leg until each of the ground engaging units is in a spinning orientation transverse to its respective swing leg; and synchronously driving at least two of the ground engaging units and thereby spinning the frame on the ground through the re-orientation angle without pivoting any of the swing legs relative to the frame during the spinning.

The method may be performed in a roadway, with the paving machine in a paving orientation facing forward along a length of the roadway, and with a transport vehicle located in the roadway ahead of the paving machine, the transport vehicle being aligned with the length of the roadway. The frame may have a left side and a right side defining a frame width between the left side and the right side. After the re-orientation the frame width may be generally aligned with the length of the roadway.

After step (c) one or more of the ground engaging units may be advanced so that the machine advances onto the transport vehicle. Then the paving machine may be carried to a new location where the process can be reversed to place the paving machine back in a paving orientation at the new location.

Any or all of the steps may be performed under control of an automatic controller.

Step (c) may include steering at least one ground engaging unit while moving the paving machine in the transport direction and with the respective swing leg associated with the at least one ground engaging unit being unlocked relative to the frame so that the respective swing leg pivots relative to the frame in response to the steering of the at least one ground engaging unit.

In step (b) the swing legs may be maintained fixed relative to the frame while rotating each of the ground engaging units relative to its respective swing leg until all of the ground engaging units are oriented primarily in the transport direction.

Step (c) may include retarding at least one ground engaging unit while moving the paving machine in the transport direction and with the respective swing leg associated with the at least one ground engaging unit being unlocked relative to the frame so that the respective swing leg pivots relative to the frame in response to the retarding of the at least one ground engaging unit. Such retarding may be accomplished by selective braking of one or more ground engaging units or advancing the ground engaging units at different speeds or a combination of selective braking and differential advance speeds.

Step (c) may include maintaining the ground engaging units always oriented in the transport direction during the pivoting of the swing legs.

BRIEF DESCRIPTION OF THE DRAWINGS

FIG. 2A shows the special case wherein the swing leg initially extends straight ahead and the initial steering angle of the crawler track is straight ahead.

FIGS. 4.1-4.19 are a sequential series of schematic drawings of the construction machine starting in the position of FIG. 1A and FIG. 4.1, and then spinning the frame counterclockwise through a re-orientation angle of about 90 degrees to the position of FIG. 4.8, then rotating each of the crawler tracks to be oriented in a transport direction as shown in FIG. 4.9, and then moving the paving machine in the transport direction and pivoting each of the swing legs to be oriented in the transport direction so that the paving machine may be driven onto a transport vehicle.

FIGS. 6.1-6.6 are a sequential series of schematic drawings of another optional technique for pivoting of the swing legs as the paving machine moves in the transport direction.

FIG. 11A is a schematic illustration showing possible crawler track interference if a center of rotation of the frame is centrally located on the frame.

FIG. 11B is a schematic illustration similar to FIG. 11A, but showing improved crawler track clearance if the center of rotation of the frame is offset to the rear of the frame.

DETAILED DESCRIPTION

Figure 1A:
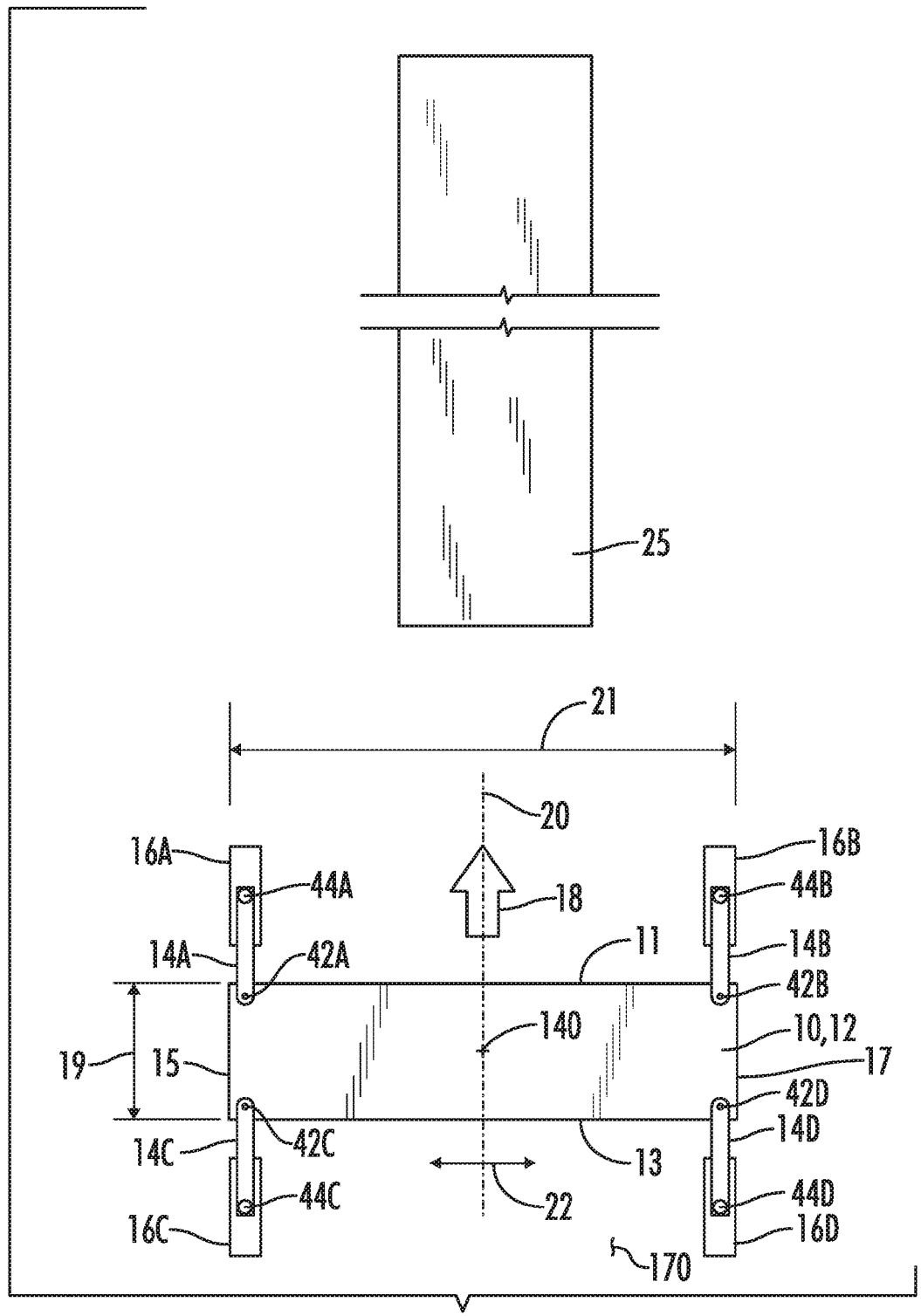
FIG. 1A is a schematic plan view of a self-propelled construction machine. A trailer is shown adjacent the construction machine and oriented at about a 90 degree angle relative to the longer dimension of the construction machine.

FIG. 1A schematically illustrates a self-propelled construction machine 10. The machine 10 includes a machine frame 12. The machine frame 12 may be described as having a front 11, a rear 13, a left side 15 and a right side 17. The frame 12 has a frame length 19 defined between the front 11 and rear 13. The frame 12 has a frame width 21 defined between the left side 15 and right side 17.

Figure 10:
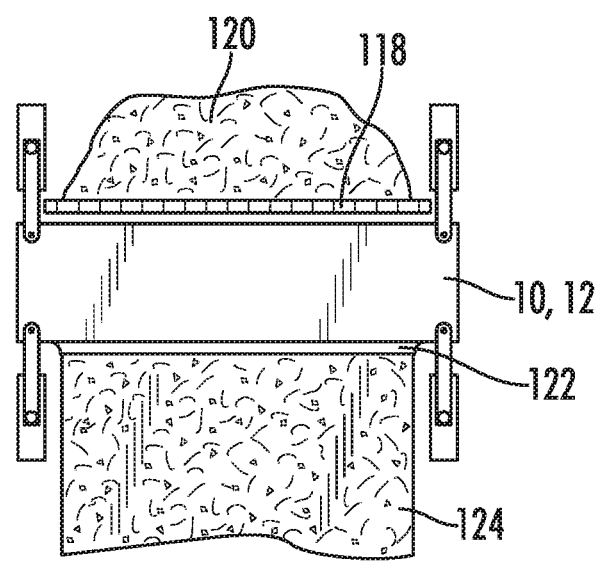
FIG. 10 is a schematic plan view of the construction machine of FIG. 1A embodied as a slipform paving machine.

As schematically illustrated in FIG. 10, the construction machine 10 may be a slip-form paver having a spreader apparatus 118 arranged to engage a mass 120 of concrete which is shaped by form 122 so that a shaped slab 124 of concrete is slip-formed by the machine 10 and exits the rear of the machine 10.

The slip-form paving machine 10 illustrated in FIG. 10 may be of any conventional construction with regard to its machine frame 12 and the arrangement of supporting swing legs and crawler tracks. The machine frame 12 may be a fixed width frame. The machine frame 12 may be a single telescoping frame which expands to one side of a main frame module for adjustment of frame width. The machine frame 12 may be a dual telescoping frame which extends from both sides of the main frame module for expansion and contraction of the width of the machine frame. The lateral sides or bolsters of the frame 12 may also be extendable in the operating direction to increase the length of the frame for mounting of accessories, such as a dowel bar inserter or the like behind the frame. The slip-form paving machine 10 may have either three or four tracks, at least one track being connected to an associated swing leg.

First, second, third and fourth swing legs 14A, 14B, 14C and 14D are pivotally connected to the machine frame 12 at pivotal axes 42A, 42B, 42C and 42D. First, second, third and fourth crawler tracks 16A, 16B, 16C and 16D are steerably connected to free ends of the swing legs 14A, 14B, 14C and 14D, respectively, at steering axes 44A, 44B, 44C and 44D. The crawler tracks may be generally referred to as ground engaging units. The ground engaging units may be crawler tracks as shown, or alternatively may be wheels. The swing legs may be referred to as left front swing leg 14A, right front swing leg 14B, left rear swing leg 14C and right rear swing leg 14D. The machine 10 moves across a ground surface under the power of the crawler tracks.

The machine frame 12 defines a longitudinal direction 18 along a longitudinal axis 20 for forward or reverse motion of the construction machine 10. The longitudinal direction 18 from rear 13 to front 11 may also be referred to as a paving direction 18. The machine frame further defines a lateral direction 22 perpendicular to the longitudinal direction 18. The lateral direction 22 may also be referred to as the "transport direction." It is noted that as used herein the terms "paving direction" and "transport direction" are defined with reference to the frame 12. It is also noted that movement in the transport direction can be in either or both of two opposite directions to either the left side or the right side of the machine frame, which can be described as movement to and fro in the transport direction.

Also shown in position ahead of the paving machine 10 is a transport vehicle 25, which may for example be a flatbed trailer 25 pulled by a tractor. The trailer 25 is shown adjacent the construction machine and oriented at about a 90 degree angle relative to the width 21 of the machine 10 as would be the typical case when an operating paving machine 10 stops and is to be re-oriented for loading on the trailer 25.

Figure 1B:
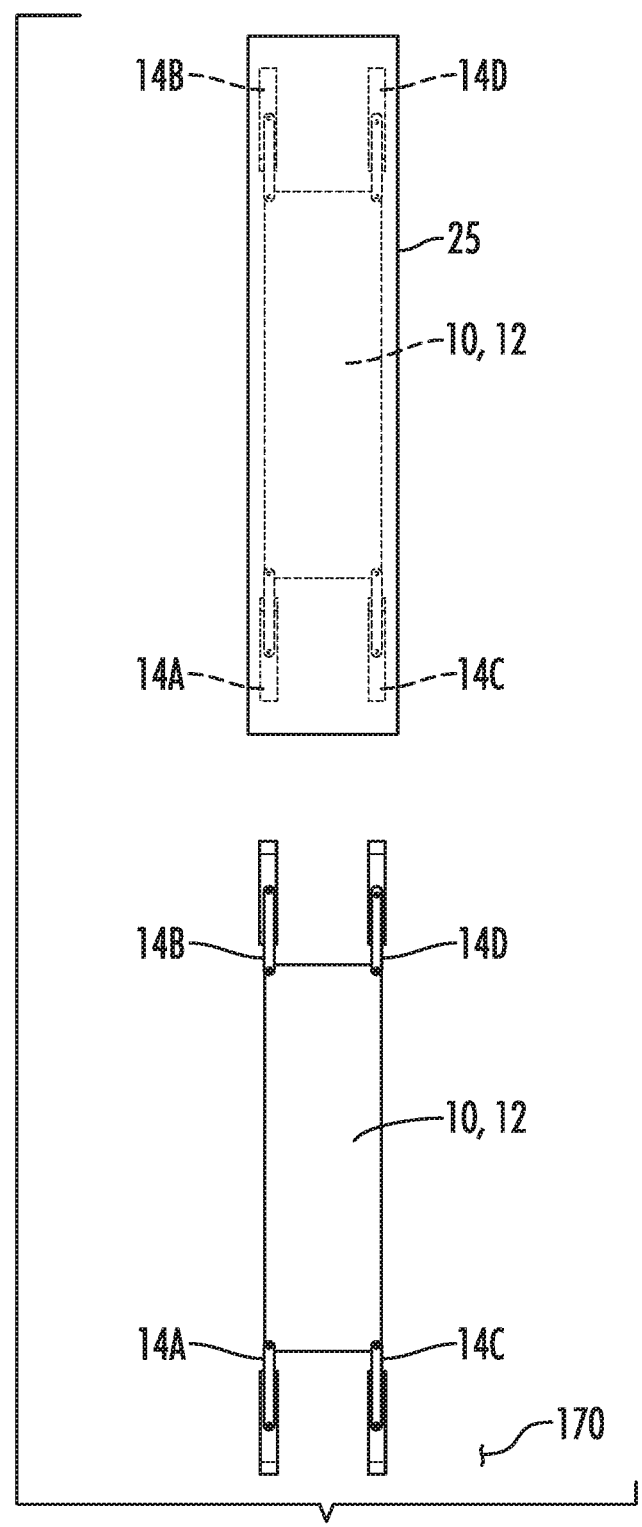
FIG. 1B is a schematic plan view similar to FIG. 1A, showing the construction machine in solid lines after the frame of the construction machine has been rotated in place on the ground through a re-orientation angle of about 90 degrees, and after the swing legs have been pivoted to their transport position where the swing legs and the crawler tracks are generally aligned with the longer dimension of the construction machine so that the machine can drive onto the trailer. The machine is shown in dashed lines after it has driven onto the trailer.

The practical problem being addressed is the need to re-orient the machine frame from its normal operating or paving orientation as shown in FIG. 1A, to a transport orientation as shown in FIG. 1B. This involves both the pivoting of the swing legs from their paving orientation to their transport orientation, and the re-orientation of the frame itself to align the frame with the transport vehicle 25 as schematically represented in FIG. 1B. In the typical field scenario, the paving machine 10 has just finished paving a stretch of roadway 170 which extends behind the paving machine 10. The existing road which is being paved extends in front of the paving machine 10. The trailer 25 is typically moved into position on the existing road ahead of the paving machine 10, as schematically shown in FIG. 1A. The trailer 25 may be resting on a shoulder of the existing road somewhat to the left or right of the machine 10. It is typically not possible to significantly move the machine 10 laterally (left and right) from its position of FIG. 1A, because of traffic in other lanes and/or because of road shoulders. Therefore it is typically necessary to rotate the machine frame 12 to sufficiently align the machine frame 12 with the transport vehicle 25 so that the machine 10 can be driven onto the transport vehicle 25. It is noted that it is also possible that the transport vehicle may not be moved into place until after the paving machine 10 has been re-oriented. It is also possible that the transport vehicle may be located in the roadway behind the paving machine instead of in front of the paving machine.

In FIG. 1B the construction machine 10 is shown in solid lines after the frame 12 of the construction machine has been rotated in place on the ground through a re-orientation angle of about 90 degrees, and after the swing legs 14A-14D have been pivoted to their transport position where the swing legs and the crawler tracks are generally aligned with the longer dimension of the construction machine so that the machine can drive onto the trailer. The machine 10 is shown in dashed lines after it has driven onto the trailer 25.

As is further described below, each crawler track 16 can be steered through a steering angle relative to its swing leg 14, and each swing leg 14 can be pivoted through a pivot angle relative to the machine frame 12. The basic geometry of this steering and pivoting motion is best explained with reference to FIG. 2A, in which the track 16A is shown in an initial orientation in solid lines, and oriented at a non-zero steering angle 24 in dashed lines. Similarly, the swing leg 14A is shown in an initial position in solid lines, and is shown as having been pivoted through a pivot angle 28 in dashed lines.

Figure 2A:
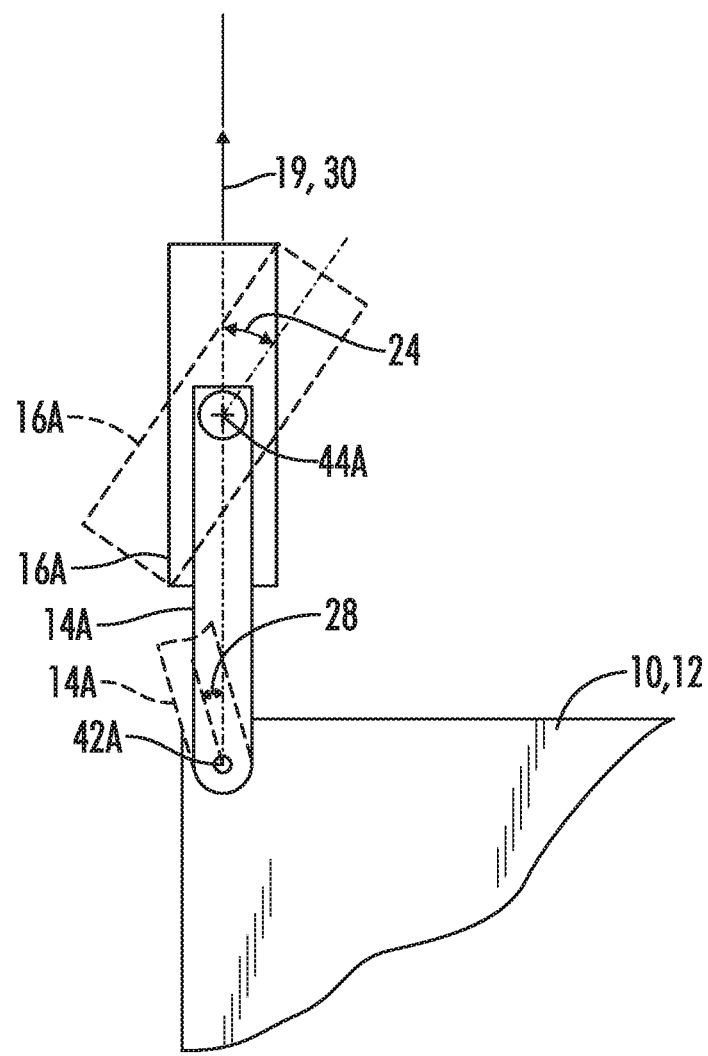
FIG. 2A is a schematic plan view of the left front corner of the construction machine of FIG. 1A illustrating the steering angle of the crawler track relative to the swing leg, and illustrating the pivot angle of the swing leg relative to the machine frame.
Figure 2B:
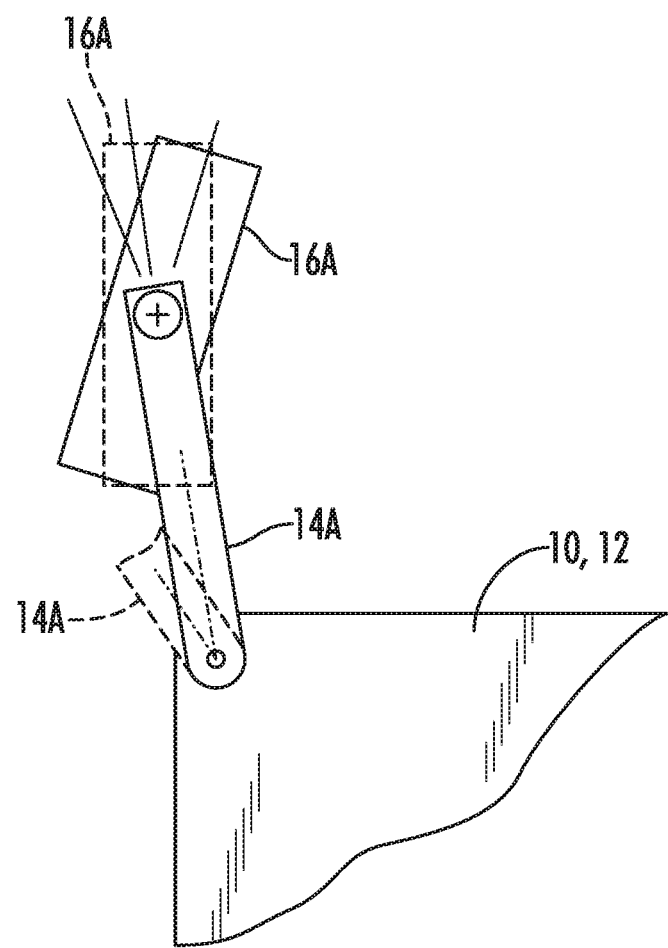
FIG. 2B is a view similar to FIG. 2A showing the more general situation wherein the swing leg initially does not extend straight ahead and the initial steering angle of the crawler track is not straight ahead.

In the example shown in FIG. 2A, for ease of illustration the initial steering angle has been shown as a straight ahead direction, and the initial position of the swing leg has been shown as a straight ahead position. But it will be understood that in the more general and typical situation the pivot legs will not necessarily begin in the straight ahead position and the initial steering angle of the tracks will not necessarily begin in the straight ahead direction. More generally, as shown in FIG. 2B the pivot legs may be in an initial position and the tracks may be steering in an initial direction, neither of which need be oriented straight ahead. For example, the forward pivot legs may already be angled away from each other, and the tracks may be oriented at a non-zero steering angle as seen in FIG. 2B, and from that initial starting position a re-positioning and re-orientation operation as described below may be performed.

Figure 3:
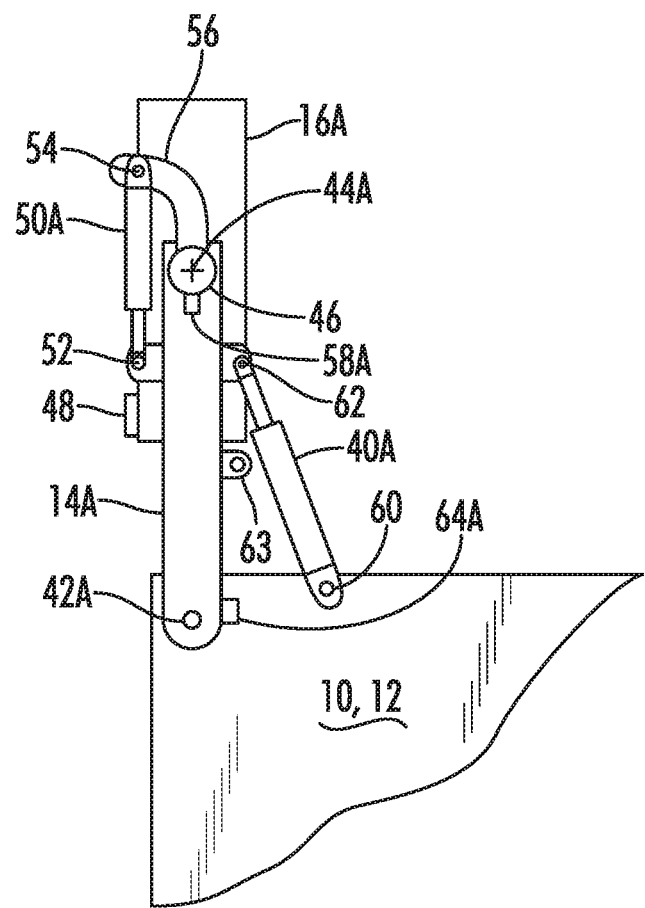
FIG. 3 is a schematic plan view of the left front corner of the construction machine of FIG. 1A showing the mechanical components of the steering system and the pivot control system of the left front swing leg. This pivot control system provides a secondary connection to allow the hydraulic ram to actively facilitate pivoting of the swing leg through an arc of greater than 90 degrees.

FIG. 3 schematically illustrates the mechanical components of a steering system and a pivot control system of the machine 10. It is noted that in some modes of operation described below before each swing leg 14 can be pivoted a locking mechanism associated with the swing leg must be released as is described below regarding the hydraulic ram or locking mechanism designated as 40A, 40B, etc. Each hydraulic ram may also be referred to as a linear actuator or as a hydraulic actuator or as a hydraulic cylinder. It is noted that the linear actuators could also be electric actuators rather than hydraulic actuators.

In FIG. 3, the first swing leg 14A is shown pivotally connected to the machine frame 12 at pivotal connection or pivotal axis 42A. The first crawler track 16A is steerably connected to the outer end of swing leg 14A so that the crawler track 16A can be steered about the vertical steering axis 44A of a lifting column 46 by which the outer end of the swing leg 14A is supported from the crawler track 16A. As will be understood by those skilled in the art, extension and retraction of the lifting column 46 can raise and lower the machine frame 12 relative to the crawler track 16A and thus relative to the ground surface. Each of the crawler tracks includes a drive motor 48 such that the crawler tracks are driven across the ground surface by the drive motors in a known manner. The drive motor 48 may be either a hydraulic motor or an electric motor.

Steering of the crawler track 16A relative to the swing leg 14A about the vertical axis 44A is accomplished by extension and retraction of a hydraulic steering cylinder 50A pivotally connected at 52 to an intermediate location on the swing leg 14A and pivotally connected at 54 to a steering arm 56 connected to rotate with the crawler track 16A. Alternatively, instead of the use of a hydraulic ram steering cylinder 50A, the track 16A may be steered relative to the swing leg 14A by a rotary actuator such as a worm gear or slew gear drive as described below with reference to FIG. 3B. Also, an electric actuator may be used instead of a hydraulic actuator, to steer the crawler track.

Each of the swing legs such as 14A may have a steering sensor 58 associated therewith, which steering sensors are configured to detect the steering angles of their respective crawler tracks relative to their respective swing legs. The steering sensors associated with the crawler tracks 16A and 16B are designated as 58A and 58B in the schematic control diagram of FIG. 7. The steering sensors may for example each be an electro-magnetic encoder, commercially available from TWK-Elektronik GmbH, Heinrichstrasse 85, 40239 Düsseldorf, Germany, as TMA 50-S A 180 W S A 16. Alternatively, instead of a separate steering sensor 58, each of the steering cylinders 50 may be a smart cylinder which includes an integrated extension sensor which monitors the amount of extension of the piston of the steering cylinder 50. From the measured extension of steering cylinder 50 and the known geometry of the steering arrangement, the steering angle 24 may be determined. In such alternative arrangement the integrated extension sensor in the steering cylinder 50 may be considered to be the steering sensor 58.

The swing leg 14A can be held in place pivotally relative to the frame 12 by the previously mentioned hydraulic ram 40A. The hydraulic ram 40A is pivotally connected to the machine frame 12 at pivotal connection 60 and to an intermediate location on the swing leg 14A at pivotal connection 62. As is further discussed below, a secondary connection point 63 is provided on each swing leg to allow the connection point of hydraulic ram 40A to be relocated during movement to the transport position of the swing leg.

In the drawings the swing legs 14 and the hydraulic rams 40 are schematically illustrated as being directly connected to the machine frame 12. It will be understood, however, that the swing legs and the hydraulic rams do not have to be directly connected to the machine frame 12. Instead, the swing legs and the hydraulic rams may be indirectly connected to the machine frame 12 by suitable mounting brackets. When one of these components is described herein as being connected to the machine frame, that includes both direct and indirect connections.

Each of the swing legs such as 14A may have a pivot sensor 64 configured to detect the respective pivot angle 28 of the respective swing leg 14. In the schematic view of the control diagram of FIG. 7, the pivot sensors for the first and second swing legs 14A and 14B are indicated as 64A and 64B. The pivot sensors may for example each be an angle sensor commercially available from Elobau GmbH & Co. KG, Zeppelinstr. 44, 88299 Leutkirch, Germany, as Part No. 424A11A05002. Alternatively, instead of a separate pivot sensor 64, each of the hydraulic rams 40 may be a smart cylinder which includes an integrated extension sensor which monitors the amount of extension of the piston of the hydraulic ram 40. From the measured extension of each hydraulic ram 40 and the known geometry of the swing leg arrangement, the pivot angle 28 may be determined. In such alternative arrangement the integrated extension sensor in the hydraulic ram 40 may be considered to be the pivot sensor 64.

It will be appreciated with reference to FIG. 3 that the swing leg 14A cannot reach the full transport position of FIG. 1B with the linear actuator 40A connected at pivot connection 62 as shown in FIG. 3. This is because with the linear actuator 40A connected at connection 62 the swing leg 14A cannot swing through a full 90 degrees without mechanical interference of the linear actuator 40A with the swing leg 14A or the machine frame 12. This can be dealt with in any one of four different ways.

First, the linear actuator 40A may simply be disconnected from connection point 62 so that the swing leg 14A is free to pivot relative to the machine frame 12.

Second, the linear actuator 40A may initially be connected at point 62 as shown in FIG. 3, and then after the swing leg 13A has pivoted counterclockwise relative to machine frame 12 through a portion of its pivot range, the actuator 40A may be disconnected from point 62 and re-connected to optional connection point 63. The linear actuator 40A may then continue to actively facilitate the motion of the swing leg 14A to its full transport position as shown in FIG. 1B.

Third and fourth alternatives are described below with regard to FIGS. 3A and 3B.

Figure 3A:
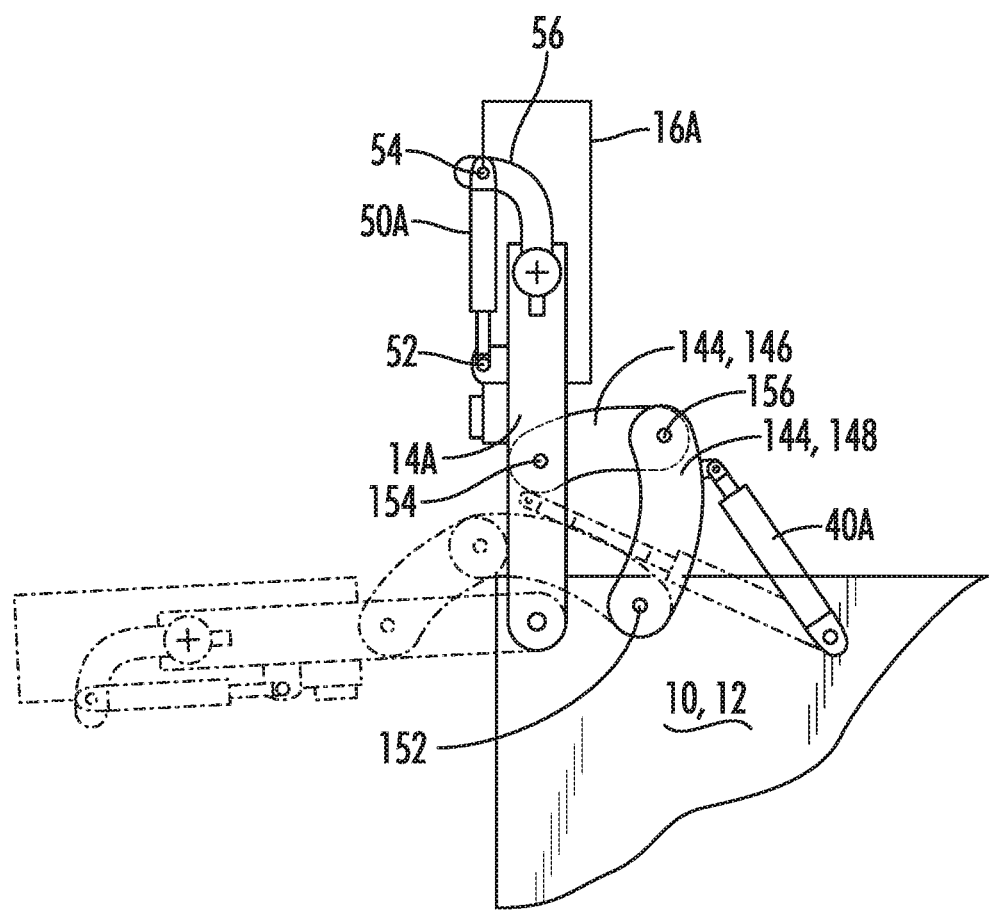
FIG. 3A is a schematic plan view similar to FIG. 3 showing an alternative pivot linkage which can pivot the swing leg through a continuous arc of greater than 90 degrees.

Alternative Steering System of FIG. 3A

In FIG. 3A an alternative steering arrangement is shown wherein a linkage 144 made up of links 146 and 148 is connected between machine frame 12 and swing leg 14A. The link 148 is pivotally connected to machine frame 12 at pivot point 152. The link 146 is pivotally connected to swing leg 14A at pivot point 154. The links 146 and 148 are pivotally connected to each other at pivot point 156. As is further described below, the steering arrangement of FIG. 3A allows for a greater range of pivoting motion of its associated swing leg.

In FIG. 3A, the operating or paving positions of the swing leg 14A, the actuator 40A and the linkage 144 relative to machine frame 12 are shown in solid lines. The transport positions of the swing leg 14A, the actuator 40A and the linkage 144 are shown in dashed lines. Through the use of the linkage 144 shown in FIG. 3A, a continuous active facilitation of the pivotal motion of swing leg 14A between the solid line position and the dashed line position can be provided by extension of the piston of the hydraulic cylinder 40A as illustrated.

Figure 3B:
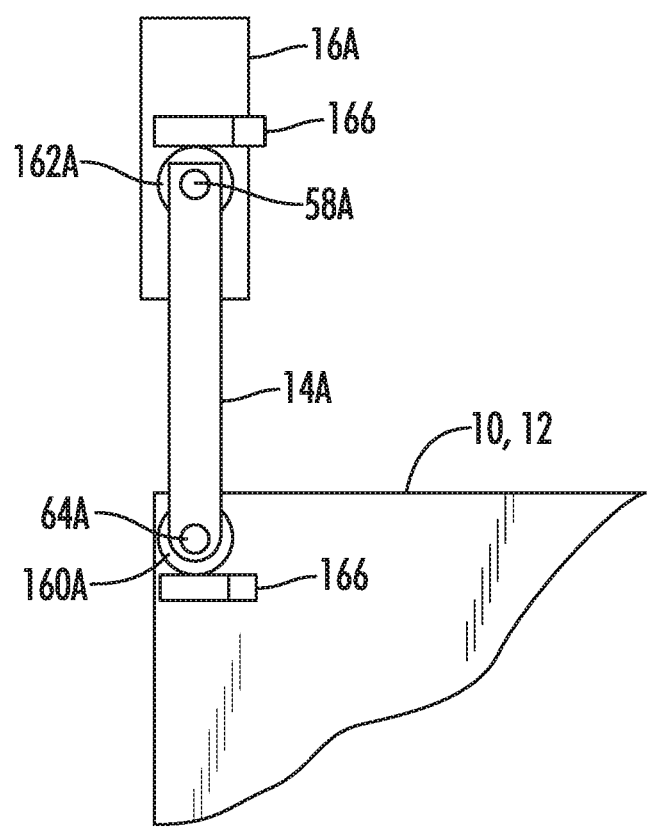
FIG. 3B is a schematic plan view similar to FIG. 3 showing an alternative arrangement wherein hydraulically powered worm gears connect the swing leg to the frame and to its respective crawler track.

Alternative Steering System of FIG. 3B

In FIG. 3B another alternative steering arrangement is shown using hydraulically powered worm gear drives 160A and 162A between swing leg 14A and the frame 12 and crawler track 16A, respectively. Similar worm gear drives are provided for each of the swing legs. Corresponding steering angle sensor 58A and pivot angle sensor 64A are also provided.

Each worm gear drive includes a hydraulic drive motor 166 which drives a worm gear which in turn drives a ring gear to achieve the rotary motion. Single or dual worm gear drives using one or two hydraulic drive motors, respectively may be used. In the case of worm gear drives the steering angle sensor 58A and/or pivot angle sensor 64A may be sensors attached to the motors 166 instead of being attached directly to the worm gear drive. In that case the sensors may count the revolutions of the motor 166, which corresponds to a known change in angle of the worm gear drive.

Figure 7:
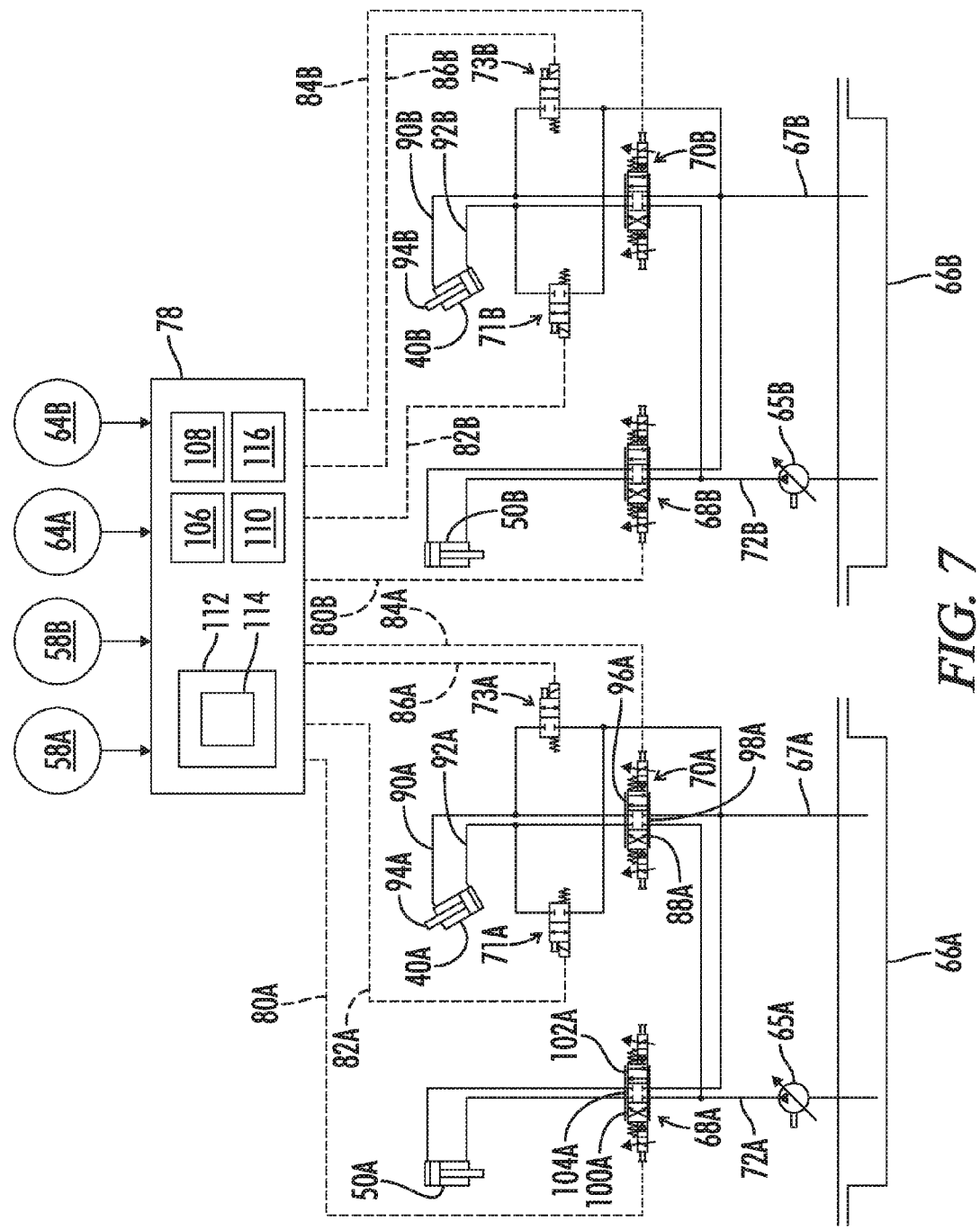
FIG. 7 is a schematic illustration of the hydraulic power system and the electronic control system for the steering system and the pivot control system of the construction machine of FIG. 1A.
Figure 8:
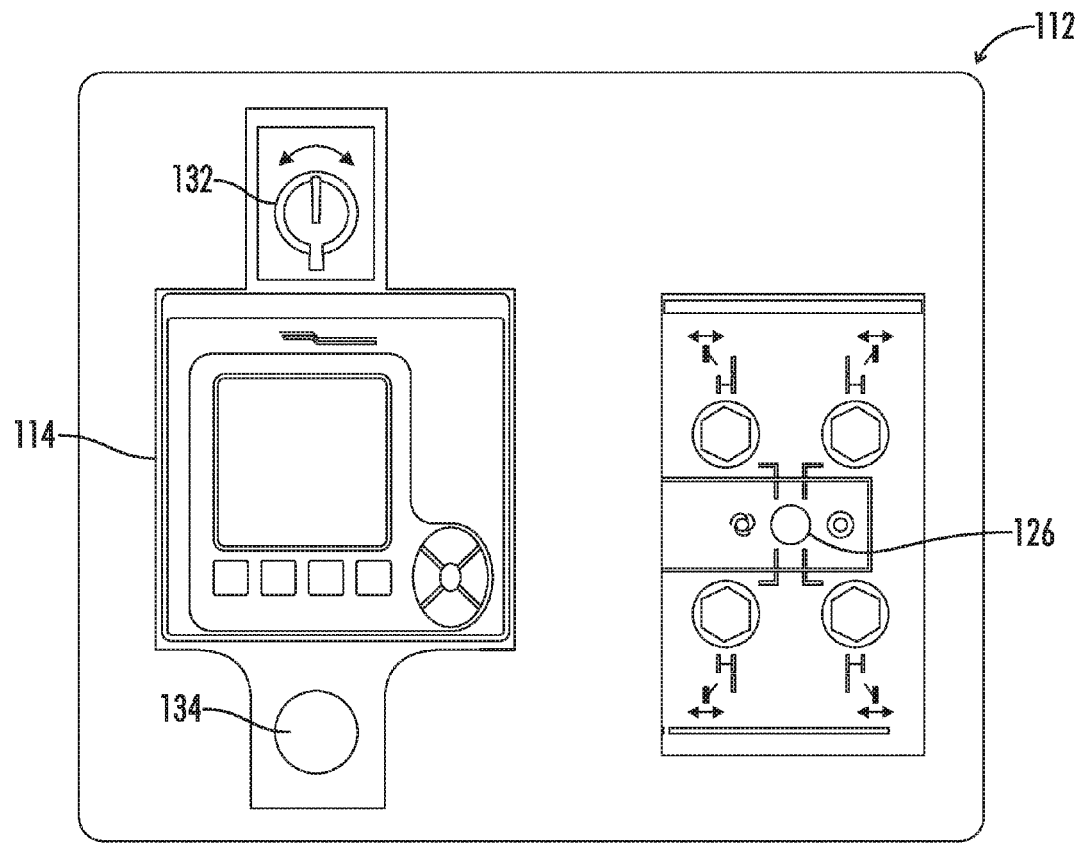
FIG. 8 is a schematic view of the control panel of the controller of FIG. 7.
Figure 9:
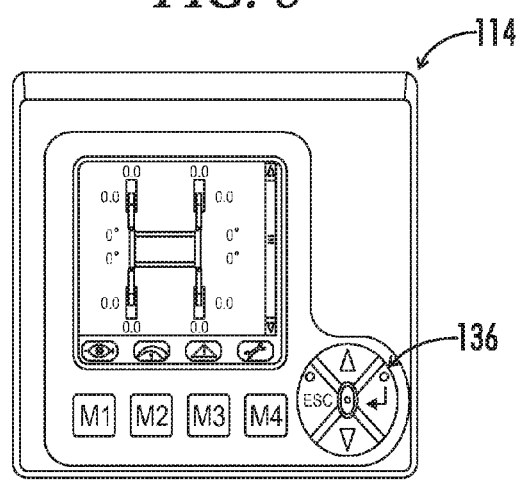
FIG. 9 is an enlarged view of the display screen and certain ones of the input controls for the control panel of FIG. 8.

The Control System of FIGS. 7-9

FIG. 7 Control System Embodiment

FIG. 7 schematically illustrates, among other things, one embodiment of a hydraulic control diagram for operation of the steering cylinder 50A and the hydraulic ram 40A associated with crawler track 16A and swing leg 14A when using the embodiment of either FIG. 3 or FIG. 3A. Also shown in FIG. 7 are the similar steering cylinder 50B and hydraulic ram 40B associated with crawler track 16B and swing leg 14B. It will be understood that similar controls are provided to the rear swing legs and crawler tracks.

The steering cylinder 50A and the hydraulic ram 40A may each be double acting hydraulic cylinders. Hydraulic fluid under pressure is provided to the cylinders from a source such as hydraulic pump 65A, and fluid discharged from the cylinders is returned to a hydraulic reservoir 66A via a return line 67A. Although FIG. 7 shows individual pumps 65 and reservoirs 66 for each leg, a common pump and reservoir may be used for multiple legs.

Directional control of hydraulic fluid into and out of the steering cylinder 50A is controlled by a first solenoid actuated variable flow three way servo-valve 68A, and control of fluid into and out of the hydraulic ram 40A is controlled by a second solenoid actuated variable flow three way servo-valve 70A.

Hydraulic fluid under pressure from pump 65A flows through a hydraulic fluid supply line 72A, to each of the variable flow three way servo-valves 68A and 70A. These variable flow valves may also be referred to as proportional valves. The valves 68A and 70A can control both the direction and the rate of flow of fluid to their respective hydraulic cylinders.

The three way valve 70A associated with the hydraulic ram 40A has a first position 88A wherein hydraulic fluid under pressure is provided to an upper end of the cylinder via hydraulic line 90A and received from a lower end of the cylinder via hydraulic line 92A for retraction of a piston 94A of the hydraulic ram 40A. The three way valve 70A can be moved to a second position 96A in which the direction of flow is reversed to extend the piston 94A. The three way valve 70A can be moved to a third position 98A wherein flow of hydraulic fluid to and from the hydraulic ram 40A is blocked. It is noted that the hydraulic lines 90A and 92A may be referred to as first and second hydraulic lines 90A and 92A, but such designation is for identification only and does not imply any specific functionality.

Also associated with the hydraulic ram 40A are first and second solenoid actuated bypass valves 71A and 73A connected to the hydraulic lines 92A and 90A. Each of the bypass valves can be selectively moved to either an open or a closed position as indicated. When in their open positions the bypass valves communicate both sides of the hydraulic ram 40A with the hydraulic reservoir 66A via the return line 67A.

Each of the hydraulic rams 40 and its associated three way valve 70 and bypass valves 71 and 73 may be referred to as a hydraulic control system or as a lock.

The construction machine 10 includes a controller 78, which may be part of a master control system of the machine 10, or may be a separate controller. The controller 78 receives input signals from various sensors such as the steering sensors 58A and 58B and the pivot sensors 64A and 64B.

It will be understood that the controller 78 may receive additional input signals from steering sensors and pivot sensors associated with the third and fourth tracks 16C and 16D, which additional inputs are not illustrated in FIG. 7. Controller 78 may also receive other inputs such as advance speed, distance traveled or other operational parameters of machine 10. One possible input for the advance speed and distance traveled by each crawler track 16 may be obtained with a sensor attached to each drive motor 48 to detect the input to the track from the drive motor. Optionally, if one wishes to avoid the possibility of input error due to track slippage, the speed and distance traveled by machine 10 may be obtained by a separate sensor that directly detects the distance traveled relative to the ground.

The controller 78 can control the volume and direction of hydraulic flow to and from the steering cylinder 50A and hydraulic ram 40A via control signals sent to three way valves 68A and 70A, respectively, over control lines 80A and 84A. The controller 78 can control the position of the bypass valves 71A and 73A via control signals sent over control lines 82A and 86A, respectively.

If three way valve 70A is in its blocked position 98A, and the bypass valves 71A and 73A are also in their blocked or closed positions, then the hydraulic ram 40A is hydraulically blocked so that it cannot move.

The hydraulic control system shown in FIG. 7 associated with hydraulic ram 40A has two alternative un-blocked positions.

In a first un-blocked position, if three way valve 70A is in its closed position 98A, and the bypass valves 71A and 73A are in their open positions, the hydraulic ram 40A is unblocked and is free to be moved by any force including but not limited to the action of the crawler track 16A pivoting the swing leg 14A. This may be described as a free floating arrangement for the hydraulic ram 40A.

In a second un-blocked position, if the three way valve 70A is in either of its positions 88A or 96A, and the bypass valves 71A and 73A are in their closed positions, then the motion of the hydraulic ram 40A can be actively facilitated by hydraulic power, or can be forced by hydraulic power, depending upon the volume of fluid supplied by pump 65A under the control of controller 78.

Similarly, the three way valve 68A associated with the steering cylinder 50A defines first and second positions 100A and 102A controlling the direction of flow to and from the steering cylinder 50A, and a third position 104A in which flow to and from the steering cylinder 50A is blocked so as to hold or maintain a given steering position of the crawler track 16A relative to the swing leg 14A.

The hydraulic lines and control lines for steering cylinder 50B and hydraulic ram 40B associated with the second crawler track 16B and the second swing leg 14B are schematically shown on the right hand side of FIG. 7 and analogous components are designated by the same numerals using a suffix B in place of a suffix A.

Figure 7A:
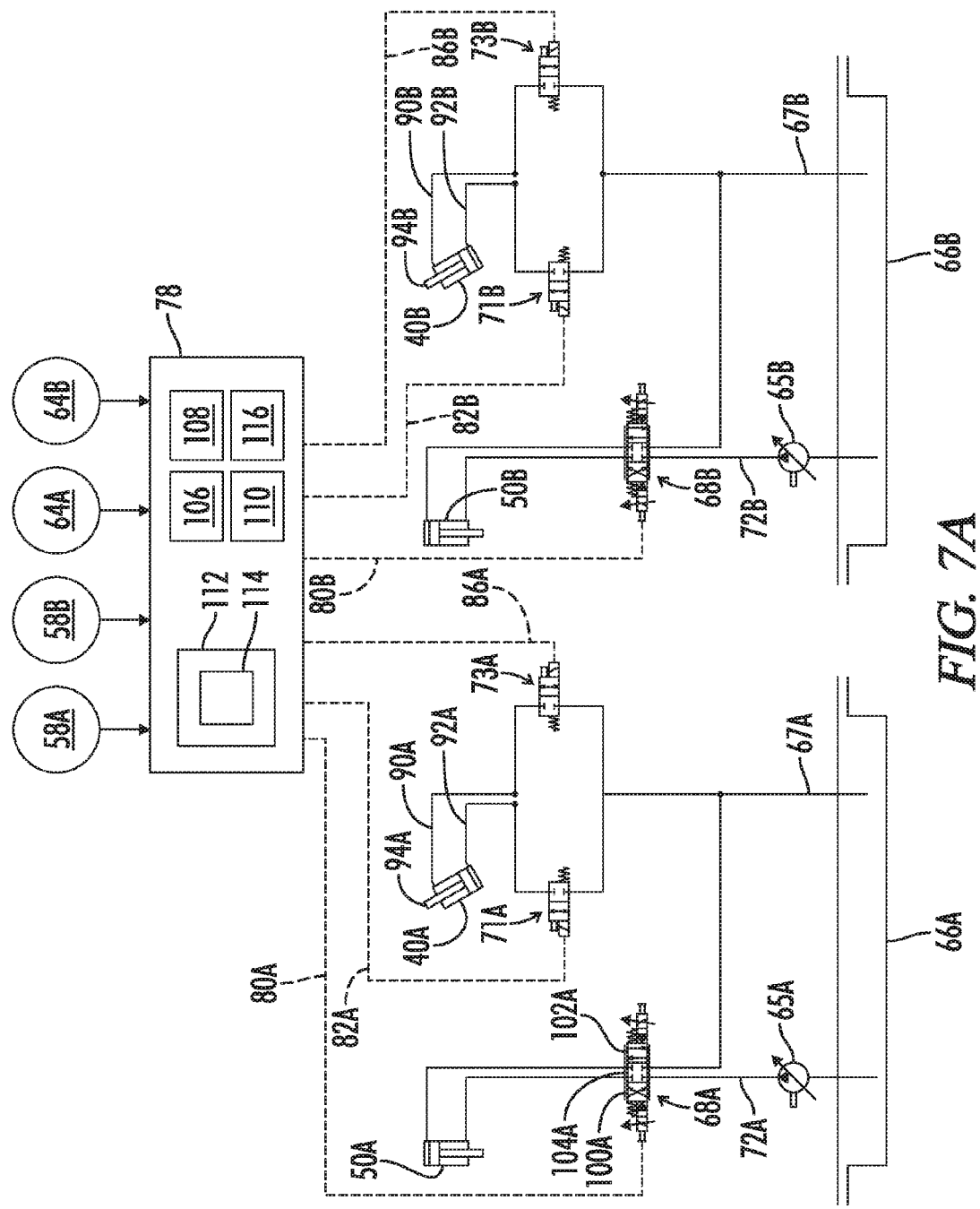
FIG. 7A is a schematic illustration similar to FIG. 7 showing an alternative embodiment of a hydraulic control system for blocking and unblocking the pivoting motion of the swing legs.

FIG. 7A Control System Embodiment

FIG. 7A is similar to FIG. 7 and illustrates a first alternative embodiment of the hydraulic control systems associated with the hydraulic rams 40A and 40B. In the embodiment of FIG. 7A the three way valves 70A and 70B of FIG. 7 have been eliminated so that the locking and unlocking of the hydraulic rams 40A and 40B is controlled solely by the bypass valves. This provides what may be referred to as a free floating arrangement of the hydraulic rams 40A and 40B. For example, the ram 40A and bypass valves 71A and 73A, along with the various hydraulic lines connected thereto may be referred to as a lock or hydraulic control system associated with the first swing leg 14A. That hydraulic control system may be described as including the first hydraulic ram 40A having a piston and a cylinder, the piston dividing the cylinder into first and second ends. First and second hydraulic lines 90A and 92A connect the fluid reservoir 66A to the first and second ends of the cylinder. The first and second bypass valves 71A and 73A are connected to the hydraulic lines 92A and 90A, respectively. Each bypass valve has a blocked position and a bypass position, the bypass position communicating the respective end of the first hydraulic ram 40A to the fluid reservoir 66A. In the hydraulically blocked position of the hydraulic control system, the first and second bypass valves 71A and 73A are in their blocked positions. In the hydraulically un-blocked position of the hydraulic control system the first and second bypass valves 71A and 73A are in their bypass positions. With this arrangement, when in the un-blocked position, the swing leg 14A is free to be moved by the forces created by engagement of the track 16A with the ground, or with any other forces imposed on the swing leg 14A, but there is no active facilitation of the pivoting of the swing leg by the hydraulic ram 40A.

Figure 7B:
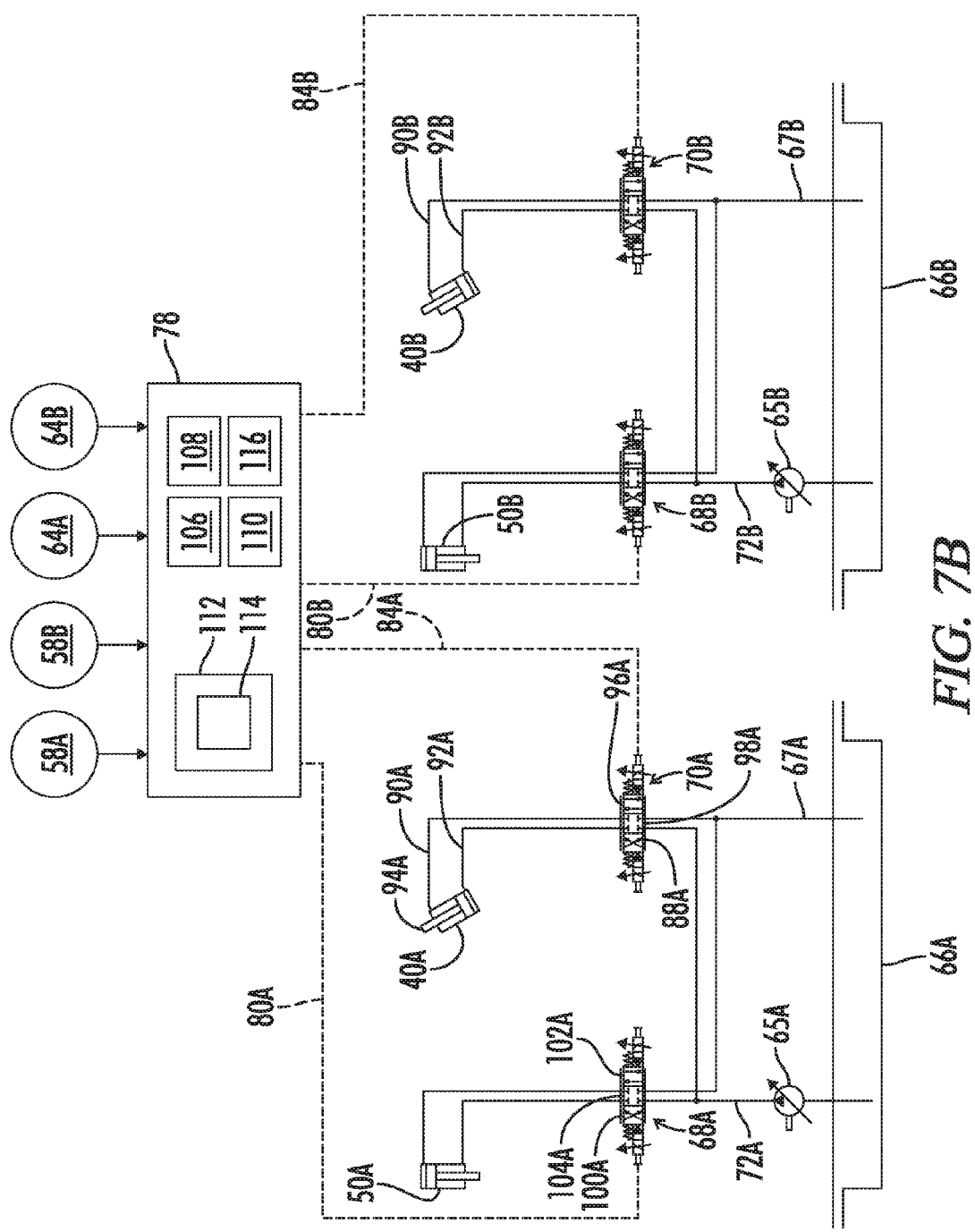
FIG. 7B is a schematic illustration similar to FIG. 7 showing another alternative embodiment of a hydraulic control system for blocking and unblocking the pivoting motion of the swing legs.

FIG. 7B Control System Embodiment

FIG. 7B is similar to FIG. 7 and illustrates a second alternative embodiment of the hydraulic control systems associated with the hydraulic rams 40A and 40B. In the embodiment of FIG. 7B the bypass valves have been eliminated so that the locking and unlocking of the hydraulic rams 40A and 40B is controlled solely by the three way valves 70A and 70B. This provides what may be referred to as a stroke controlled arrangement of the hydraulic rams 40A and 40B. For example, the ram 40A and three way valve 70A along with the various hydraulic lines connected thereto may be referred to as a lock or hydraulic control system associated with the first swing leg 14A. That hydraulic control system may be described as including the first hydraulic ram 40A having a piston and a cylinder, the piston dividing the cylinder into first and second ends. The three way valve 70A has an extension position 96A, a retraction position 88A, and a blocked position 98A. The hydraulic lines 90A and 92A connect the three way valve 70A to the first and second ends of the cylinder. The supply line includes supply line 72A and a selected one of the lines 90A and 92A, and the return line includes the return line 67A and the other of the lines 90A and 92A. In the hydraulically blocked position of the hydraulic control system the three way valve 70A is in the blocked position 98A. In the hydraulically un-blocked position of the hydraulic control system, the three way valve 70A is in either its extension or retraction position 96A or 88A, and the controller 78 is configured such that the first hydraulic ram 40A actively facilitates the pivoting of the first swing leg 14A. The controller 78 may determine a specific amount of desired movement of the swing leg 14A via an algorithm, and the controller 78 may then cause a specific volume of fluid to be delivered to hydraulic ram 40A so that a stroke or extension of the hydraulic ram 40A is exactly controlled. The algorithm may calculate the exact movement of the swing leg 14A which will result from the advance speed and steering inputs to the track 16A, and then actively facilitate the movement of the swing leg by that same amount so that frictional forces or other resistance to the movement of the swing leg assembly are compensated for by the active facilitation. It will be understood that with this arrangement, if the algorithm is slightly in error it is the stroke imparted to the hydraulic ram 40A that will control the final pivotal position of the swing leg 14A.

Figure 7C:
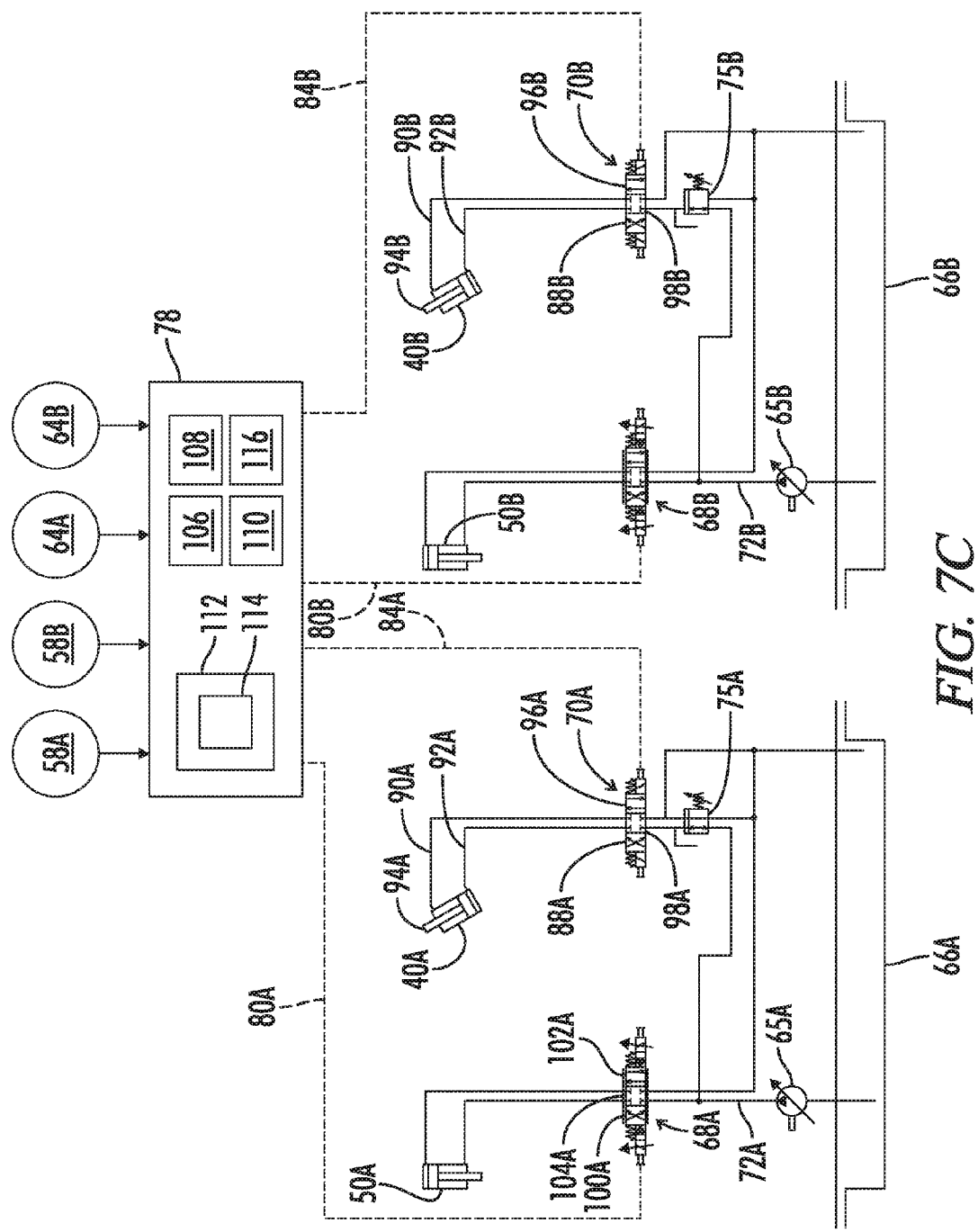
FIG. 7C is a schematic illustration similar to FIG. 7 showing another alternative embodiment of a hydraulic control system for blocking and unblocking the pivoting motion of the swing legs.

FIG. 7C Control System Embodiment

FIG. 7C is similar to FIG. 7 and illustrates a third alternative embodiment of the hydraulic control systems associated with the hydraulic rams 40A and 40B. In the embodiment of FIG. 7C the bypass valves have been eliminated and the three way valves 70A and 70B have been modified to be simpler and less expensive three way valves that are not servo-valves. Also, pressure control valves 75A and 75B have been added in the fluid supply lines 72A and 72B upstream of the three way valves 70A and 70B. With this arrangement the controller 78 is configured such that the active facilitation of the pivoting of the swing legs 14A and 14B by the hydraulic rams 40A and 40B is limited to providing a hydraulic pressure to the hydraulic rams 40A and 40B controlled by the pressure control valves 75A and 75B.

The arrangement of FIG. 7C provides what may be referred to as a pressure controlled arrangement of the hydraulic rams 40A and 40B. For example, the ram 40A and three way valve 70A along with the various hydraulic lines connected thereto may be referred to as a lock or hydraulic control system associated with the first swing leg 14A. That hydraulic control system may be described as including the first hydraulic ram 40A having a piston and a cylinder, the piston dividing the cylinder into first and second ends. The three way valve 70A has an extension position 96A, a retraction position 88A, and a blocked position 98A. Hydraulic lines 90A and 92A connect the three way valve 70A to the first and second ends of the cylinder. The supply line includes supply line 72A and a selected one of the lines 90A and 92A, and the return line includes the return line 67A and the other of the lines 90A and 92A. In the hydraulically blocked position of the hydraulic control system the three way valve 70A is in the blocked position 98A. In the hydraulically un-blocked position of the hydraulic control system, the three way valve 70A is in either its extension or retraction position 96A or 88A, and the controller 78 is configured such that the first hydraulic ram 40A actively facilitates the pivoting of the first swing leg 14A by supplying a pressure to the selected end of the hydraulic ram 40A controlled by the pressure control valve 75A. It will be understood that with this arrangement, the steering of the track 16A and various other force inputs will control the final pivotal position of the swing leg 14A, and the pressure provided via the three way valve 70A and pressure control valve 75A will merely help overcome frictional resistance to that pivoting movement.

Figure 7D:
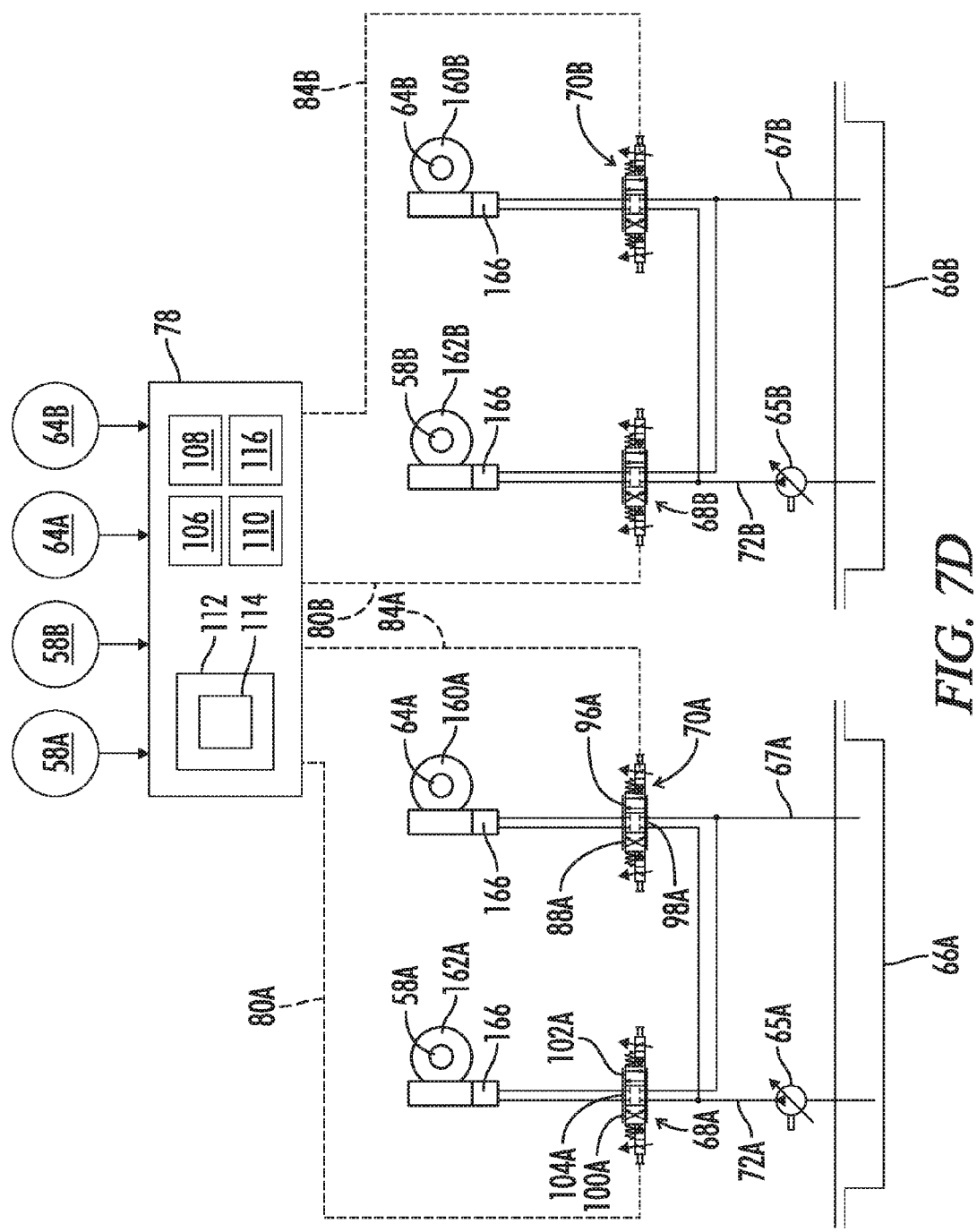
FIG. 7D is a schematic illustration similar to FIG. 7 showing another alternative embodiment of a hydraulic control system for use with the hydraulic worm gear drives of FIG. 3B.

FIG. 7D Control System Embodiment

FIG. 7D schematically illustrates, among other things, one embodiment of a hydraulic control diagram for operation of the hydraulic worm gear drives 160A and 162A associated with crawler track 16A and swing leg 14A as shown in the alternative embodiment of FIG. 3B. Also shown in FIG. 7D are the similar hydraulic worm gear drives 160B and 162B associated with crawler track 16B and swing leg 14B. It will be understood that similar controls are provided to the rear swing legs and crawler tracks when using hydraulic worm gear drives.

The hydraulics in this arrangement are similar to those described above in FIG. 7B and similar components use the same identifying numbers in the drawings.

To pivot the swing leg 14A relative to frame 12 hydraulic fluid may be directed in either direction to the motor 166 of hydraulic worm gear drive 160A via control valve 70A. Positions 88A and 96A of control valve 70A provide rotation of the hydraulic worm gear drive 160A in either selected rotational direction. Position 98A of control valve 70A blocks the worm gear drive 162A and prevents rotation. It is noted that due to the inherent manner of operation of a worm gear drive having a permanent engagement between a ring gear and one or more worm gears, the worm gear drive does not really have an unlocked position allowing for free rotation of the pivotal connection. But in the position 98A there is no flow of fluid in either direction through the motor 166 of the worm gear drive so there is no rotation of the worm gear drive in that position of the control valve 70A.

Similarly, to steer the crawler track 16A relative to swing leg 14A, hydraulic fluid may be directed in either direction to the motor 166 of hydraulic worm gear drive 162A via control valve 68A. Positions 100A and 102A of control valve 68A provide rotation of the hydraulic worm gear drive 162A in either selected rotational direction. Position 104A of control valve 68A blocks the worm gear drive 162A and prevents rotation.

The Controller

Controller 78 includes a processor 106, a computer readable memory medium 108, a data base 110 and an input/output module or control panel 112 having a display 114.

The term "computer-readable memory medium" as used herein may refer to any non-transitory medium 108 alone or as one of a plurality of non-transitory memory media 108 within which is embodied a computer program product 116 that includes processor-executable software, instructions or program modules which upon execution may provide data or otherwise cause a computer system to implement subject matter or otherwise operate in a specific manner as further defined herein. It may further be understood that more than one type of memory media may be used in combination to conduct processor-executable software, instructions or program modules from a first memory medium upon which the software, instructions or program modules initially reside to a processor for execution.

"Memory media" as generally used herein may further include without limitation transmission media and/or storage media. "Storage media" may refer in an equivalent manner to volatile and non-volatile, removable and non-removable media, including at least dynamic memory, application specific integrated circuits (ASIC), chip memory devices, optical or magnetic disk memory devices, flash memory devices, or any other medium which may be used to stored data in a processor-accessible manner, and may unless otherwise stated either reside on a single computing platform or be distributed across a plurality of such platforms. "Transmission media" may include any tangible media effective to permit processor-executable software, instructions or program modules residing on the media to be read and executed by a processor, including without limitation wire, cable, fiber-optic and wireless media such as is known in the art.

The terms "controller," or "control circuitry" as used interchangeably herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Accordingly, the steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integrated with the processor.

The controller 78 receives input data from the sensors 58 and 64. The controller also receives other inputs such as the track speed and magnitude of movement. Based upon the programming 116 the controller 78 can control the magnitude of the pivot angle 28, the speed of the tracks, the magnitude of movement of the tracks and the steering angle 24, for each of the swing legs.

FIG. 8 is a schematic view of the control panel 112. It will be understood that the control panel 112 as shown in FIG. 8 is simplified to show only the controls of interest, and control panel 112 will typically include many controls other than those shown. Also, the control panel 112 may comprise one consolidated control panel for all the controls shown, or those controls may be distributed among two or more control panels. FIG. 9 is a schematic view of the display unit 114 of the control panel 112.

Transport Conversion Mode Process of FIGS. 4.1-4.19

The basic transport conversion mode process is illustrated in the sequential series of views 4.1-4.19.

The process may begin in the orientation of FIG. 4.1 which also corresponds to the orientation shown in FIG. 1A. In FIG. 4.1 the paving machine 10 is located in a roadway 170 with the paving machine in its paving orientation facing forward along a length of the roadway 170. In the paving orientation of the paving machine 10 the swing legs 14 and the ground engaging units 16 are oriented primarily in the paving direction 18. Also as shown in FIGS. 1A and 4.19, the transport vehicle 25 may be located in the roadway 170 ahead of the paving machine 10. The transport vehicle 25 may be aligned with the length of the roadway 170.

It will be appreciated that when either the swing legs or the ground engaging units are described as being "oriented primarily in the paving direction" they may be parallel to the paving direction, but often they will not be exactly parallel to the paving direction. As seen for example in FIG. 2B the ground engaging units may have a steering angle that is not directly ahead. And as seen for example in FIG. 4.1 the swing legs may be slightly splayed outward or inward. As used herein, the term "oriented primarily" in a given direction may include angles of plus or minus 30 degrees, or more preferably plus or minus 10 degrees from the stated reference direction.

Next as seen in FIG. 4.2 each of the ground engaging units 16 is rotated relative to its respective swing leg 14 until each of the ground engaging units is in a spinning orientation transverse to its respective swing leg. As used herein the term "transverse" is used in its broadest sense to mean not parallel to. The term "perpendicular" is used to indicate a 90 degree orientation. So a "transverse" orientation is not necessarily a "perpendicular" orientation, although it can be.

The preferred transverse orientation of the ground engaging units in FIG. 4.2 is such that each ground engaging unit 16 is substantially perpendicular to a radius through a common point of rotation for all of the ground engaging units.

After placing the ground engaging units 16 in a spinning orientation like that of FIG. 4.2, the drive units of two or more of the ground engaging units are activated to spin the frame 12 on the ground through the re-orientation angle, such as motion from the position of FIG. 4.2 to the position of FIG. 4.8, which constitutes a re-orientation angle of substantially 90 degrees. Preferably the spinning action occurs without pivoting any of the swing legs 14 relative to the frame 12 during the spinning.

It will be appreciated that the relative orientations of the swing legs and ground engaging units, and the drive speed of the ground engaging units will determine the manner in which the frame 12 spins or rotates. These parameters may be chosen to spin or rotate the frame about a fixed center of rotation, but they need not be. The center of rotation can move as the frame spins.

After the frame 12 achieves the desired re-oriented position relative to the ground, such as the position 4.8, each of the ground engaging units 16 is rotated relative to its respective swing leg 14 until each ground engaging unit 16 is primarily oriented relative to frame 12 in the transport direction, such as is seen in FIG. 4.9.

In FIGS. 4.8-4.19 the frame 12 may be described as having its frame width 21 generally aligned with the length of the roadway 170.

Next the paving machine 10 is moved in the transport direction, which in FIGS. 4.9-4.19 is upward in the figures. Note that the figures show reference features 168 adjacent the roadway 170 so that the advancing movement of the paving machine 10 is apparent in the sequential figures.

As is represented in the sequential FIGS. 4.9-4.19, while the paving machine 10 is moving in the transport direction each of the swing legs 14 is pivoted relative to the frame 12 until each swing leg 14 is oriented primarily in the transport direction relative to the frame 12. As is further described below, the swing leg pivoting movement represented by the sequential FIGS. 4.9-4.19 can be accomplished in several different ways.

Once the swing legs 14 are in the position shown in FIG. 4.19 relative to the frame 12, the paving machine 10 can be driven onto the transport vehicle 25 by advancing one or more of the ground engaging units 16. The orientation of paving machine 10 may be described as a transport orientation. In the transport orientation the swing legs and the ground engaging units are all oriented primarily in the transport direction. Then the paving machine 10 can be transported to a new location by the transport vehicle 25. Upon reaching the new location the paving machine 10 may be driven in a reverse transport direction off of the transport vehicle onto a new roadway located at the new location. Assuming that the paving machine 10 is unloaded onto the new roadway in an orientation with the width 21 of frame 12 aligned with the length of the new roadway, the paving machine 10 will again be in the orientation shown in FIG. 4.19 relative to the new roadway. Then the procedure of FIGS. 4.1-4.19 may be performed in reverse order to place the paving machine back in a proper paving orientation relative to the new roadway. First the paving machine is moved along the new roadway and the swing legs are pivoted relative to the frame 12 back to a paving orientation relative to the frame; this is essentially a reversal of the steps of FIGS. 4.9-4.19. Then the ground engaging units 16 are rotated to a spinning orientation as in FIG. 4.8. Then the frame 12 may spin through a second re-orientation angle of substantially 90 degrees back to the orientation of FIG. 4.2. Then the ground engaging units 16 may be rotated relative to the swing legs 14 back to the orientation of FIG. 1A.

Although the process illustrated in FIGS. 4.1-4.8 shows re-orientation through a re-orientation angle of substantially 90 degrees, it will be appreciated that a similar result can be achieved by re-orientation through any odd multiple of 90 degrees, e.g. 90 degrees or 270 degrees or 450 degrees, etc.

It will be appreciated that when the machine frame 12 is described as rotating "in place" or "substantially in place" on the ground through a re-orientation angle, it is not required that some center point, such as point 140 in FIG. 1A, remain exactly fixed relative to the ground during the rotation. That would be impossible to achieve in real life. From the practical standpoint what is important is that the paving machine 10 be able to rotate through a re-orientation angle of approximately 90 degrees within the typical available space on a construction site where a portion of a roadway is being paved. In general, rotating "in place" or "substantially in place" can be considered to be achieved if a geometrical center point or centroid of the area of the paving machine 10 (such as point 140) remains within an original footprint occupied by the paving machine 10 at the beginning of the rotational operation.

FIGS. 11A and 11B illustrate another alternative modification of the examples described above. FIG. 11A shows the machine frame 12 having been rotated about center of rotation 140 through a re-orientation angle of about 90 degrees to a position like that shown in FIG. 4.8. The center of rotation 140 may be described as lying substantially on the longitudinal centerline 20, and also substantially on a lateral centerline 23 lying substantially mid-way between the front and rear 11 and 13 of machine frame 12. It is noted that depending on the dimensions of the frame and of the crawler tracks 16, it is possible that left front track 16A may interfere with left rear track 16C, and right front track 16B may interfere with right rear track 16D. The steering axes 44A-D of the ground engaging units 16A-D are each shown as being perpendicular to radii 138A-D, respectively, through the center of rotation 140.

FIG. 11B shows an alternative arrangement wherein the tracks 16 have been oriented so as to rotate the frame 12 about an offset center of rotation 140' which in this case is offset to approximately the rear 13 of the machine frame 12. With this orientation of the tracks it is seen that the left front track 16A does not interfere with the left rear track 16C, and the right front track 16B does not interfere with the right rear track 16D. In this embodiment the center of rotation 140' may be described as being substantially offset from the lateral centerline 23. The steering axes 44A-D of the ground engaging units 16A-D are each shown as being perpendicular to radii 138A-D, respectively, through the offset center of rotation 140'.

Although in each of the embodiments described herein, the re-orientation angle has been described as being substantially 90 degrees, or substantially an odd multiple of 90 degrees, it will be appreciated that in general it is not necessary to rotate the machine frame through a re-orientation angle of exactly 90 degrees. So long as the machine frame is rotated through a sufficient angle that it can then drive perhaps in a curved path if not an exactly straight path, onto the transport vehicle 25, the same result is achieved. In general, the re-orientation angle is preferably in a range of plus or minus 30 degrees from an odd multiple of 90 degrees. More preferably the re-orientation angle is in a range of plus or minus 10 degrees from an odd multiple of 90 degrees.

Also, it will be appreciated that although each of the swing legs 14 is shown as pivoting through an angle of approximately 90 degrees from its operating position of FIG. 1A to its transport position of FIG. 1B, that pivot angle also does not have to be exactly 90 degrees. In general, the pivot angle between the operating position and the transport position for each swing leg may be described as being at least about 80 degrees relative to the paving direction. It is also possible for the pivot angle of each swing leg to be greater than 90 degrees. For example, it is sometimes desired to angle the swing legs 14A and 14C toward each other when they are in their final position like that of FIG. 4.19, so as to narrow the distance between the outer edges of the ground engaging units once they are in their transport position.

As previously noted, there are several different ways in which the swing leg pivoting motion shown in FIGS. 4.9-4.18 may be accomplished. Three examples are discussed below, which are referred to herein as the "Swing Over Steering" technique, the "Selective Braking And/Or Differential Speed" technique, and the "Steer Over Swinging" technique. These techniques may be combined, and other techniques may also be used.

Figure 5:
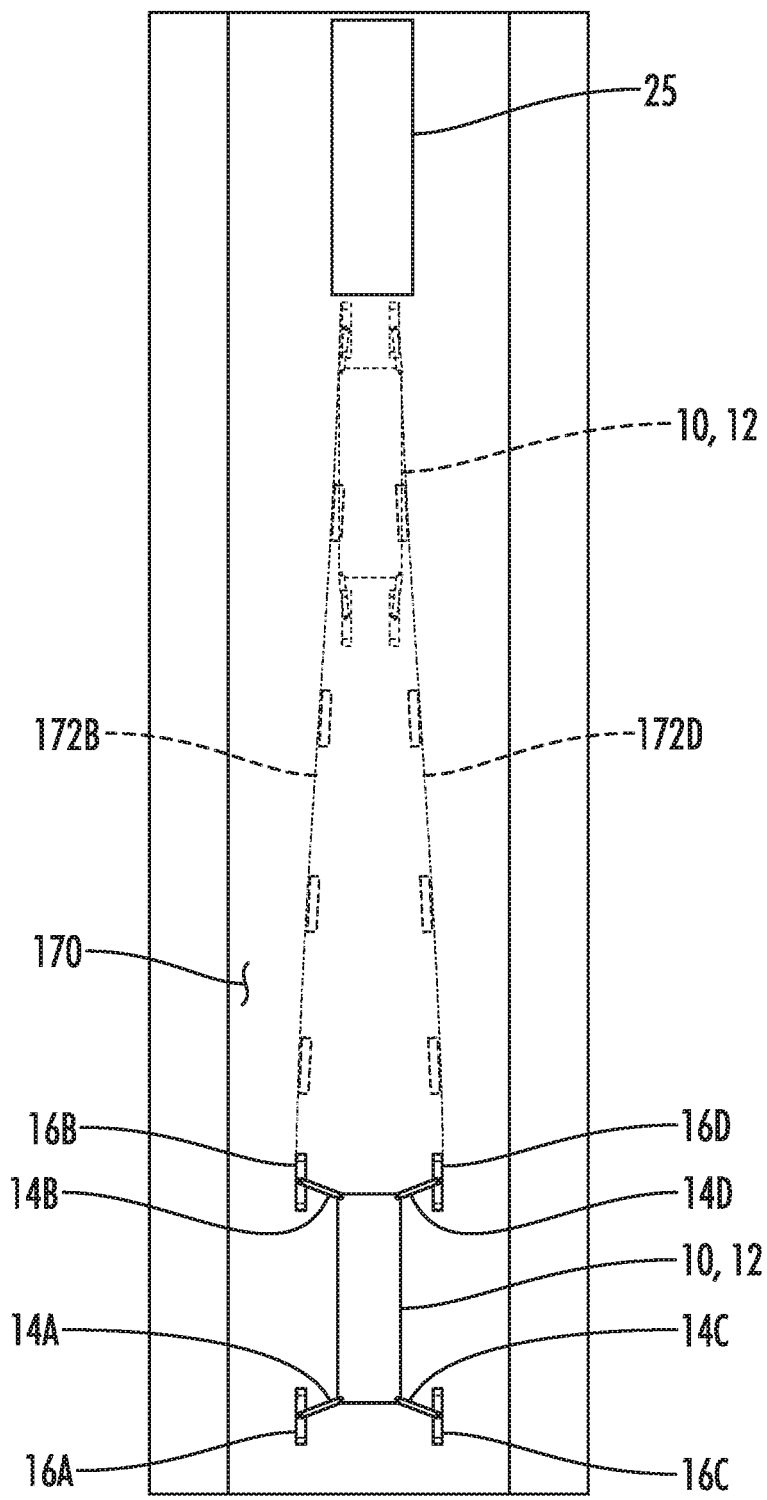
FIG. 5 is a schematic illustration of one optional technique for pivoting of the swing legs as the paving machine moves in the transport direction.

"Swing Over Steering" Technique of FIG. 5

"The Swing Over Steering" technique is schematically illustrated in FIG. 5. In this technique the swing legs 14 to be pivoted are unlocked relative to the frame 12 so that the swing legs 14 may pivot relative to the frame 12. Then with the swing legs 14 unlocked and with the paving machine moving along the roadway 170 the ground engaging units are steered such that the swing legs pivot relative to the machine frame in response to the steering of the ground engaging unit due to a lateral component of force exerted on the swing leg by the ground engaging unit. This procedure is in accordance with the teachings of U.S. Pat. No. 9,388,537, the details of which are incorporated herein by reference. If desired, this pivoting of the swing leg may be actively facilitated by the application of a pivoting force via the hydraulic ram 40 if the embodiment of either FIG. 3 or FIG. 3A is used. or via the hydraulic worm gear drive 160 if the embodiment of FIG. 3B is used.

In the lower portion of FIG. 5 the paving machine 10 is shown in solid lines in a position corresponding to the position of FIG. 4.9. The swing legs 14A-4D are unlocked and as the paving machine 10 advances in the transport direction the ground engaging units 16A-16D are steered along respective curved paths until the ground engaging units reach the positions shown in dashed lines at the top of FIG. 5. The dashed line position at the top of FIG. 5 corresponds to the position shown in FIG. 4.19. Two of the curved paths of ground engaging units 16B and 16D are schematically shown as 172B and 172D, respectively. Because the swing legs are unlocked they follow the ground engaging units and swing inward as the ground engaging units are steered along the paths such as 172B and 172D.

It is also noted that if there is insufficient available distance between the paving machine 10 and the transport vehicle to achieved the desired swinging movement of the swing legs in a single traverse of the available distance, the paving machine 10 may be moved to and fro in the transport direction while appropriately steering the ground engaging units to progressively swing the swing legs toward the desired position during each to or fro movement along the transport direction "Selective Braking and/or Differential Speed" Technique of FIGS. 6.1-6.6

FIGS. 6.1-6.6 schematically illustrate a combination of techniques that may be described as selective braking and/or differential speed techniques. Both selective braking and providing differential speeds may be described as retarding the selected ground engaging units. FIG. 6.1 represents a position of the paving machine 10 like that of FIG. 4.9.

In the first half of this example as shown in FIGS. 6.1-6.3, the swing legs 14A and 14C are unlocked while the swing legs 14B and 14D are locked. The paving machine 10 advances in the transport direction via driving of the ground engaging units 16B and 16D. The ground engaging units 16A and 16C are retarded by either not being driven, or being driven at a slower speed, or being braked, thus causing the swing legs 14B and 14D to swing inward to the position of FIG. 6.3. Then the swing legs 14A and 14C may be locked in position relative to frame 12 and the swing legs 14B and 14D may be unlocked. Then as the paving machine continues to advance in the transport direction under power of the ground engaging units 16B and 16D, while the ground engaging units 16A and 16C are either not driven, or are driven at a slower speed, or are braked, the swing legs 14B and 14D will pivot inward from the position of FIG. 6.3 to the position of FIG. 6.6.

While the swing legs 14 are pivoting, the respective ground engaging units 16 may be steered relative to their respective swing legs in response to control signals from controller 78 to maintain the ground engaging units pointed ahead in the transport direction.

It is also noted that the "Selective Braking And/Or Differential Speed" technique may be combined with either "Swing Over Steering" technique or the "Steer Over Swinging" technique to aid in achieving the desired pivoting motion of the swing legs.

"Steer Over Swinging" Technique

"Steer Over Swinging" refers to a technique wherein the pivoting or swinging motion of the swing legs 14 is positively controlled by action of the hydraulic rams 40 if using the embodiment of either FIG. 3 or FIG. 3A, or by the hydraulic worm gear drive 160 if using the embodiment of FIG. 3B, so as to perform the pivoting motions seen in FIGS. 4.9-4.19.

The controller 78 may monitor the pivot angles 28 via pivot angle sensors 64. The controller 78 may determine at any given time the desired steering angle 24 so as to maintain the ground engaging unit 16 in a straight ahead orientation, and the controller 78 may send appropriate control signals to the steering cylinders 50 if using the embodiment of either FIG. 3 or FIG. 3A, or to the hydraulic worm gear drive 162 if using the embodiment of FIG. 3B, so as to maintain the ground engaging units 16 in a straight ahead orientation during the pivoting of the swing legs 14, as seen in FIGS. 4.9-4.19.

Controller Implementation of the Transport Conversion Mode

The controller 78 includes a transport conversion mode configured to spin the machine frame 12 in place on the ground through a re-orientation angle, then rotate each of the ground engaging units relative to its respective swing leg until each ground engaging unit is primarily oriented in a transport direction generally perpendicular to the paving direction, and then while moving the paving machine in the transport direction pivoting each of the swing legs relative to the frame until each swing leg is oriented primarily in the transport direction. The controller 78 may implement this transport conversion mode using any of the "Swing Over Steering", "Selective Braking And/Or Differential Speed", and "Steer Over Swinging" techniques described above.

Figure 12:
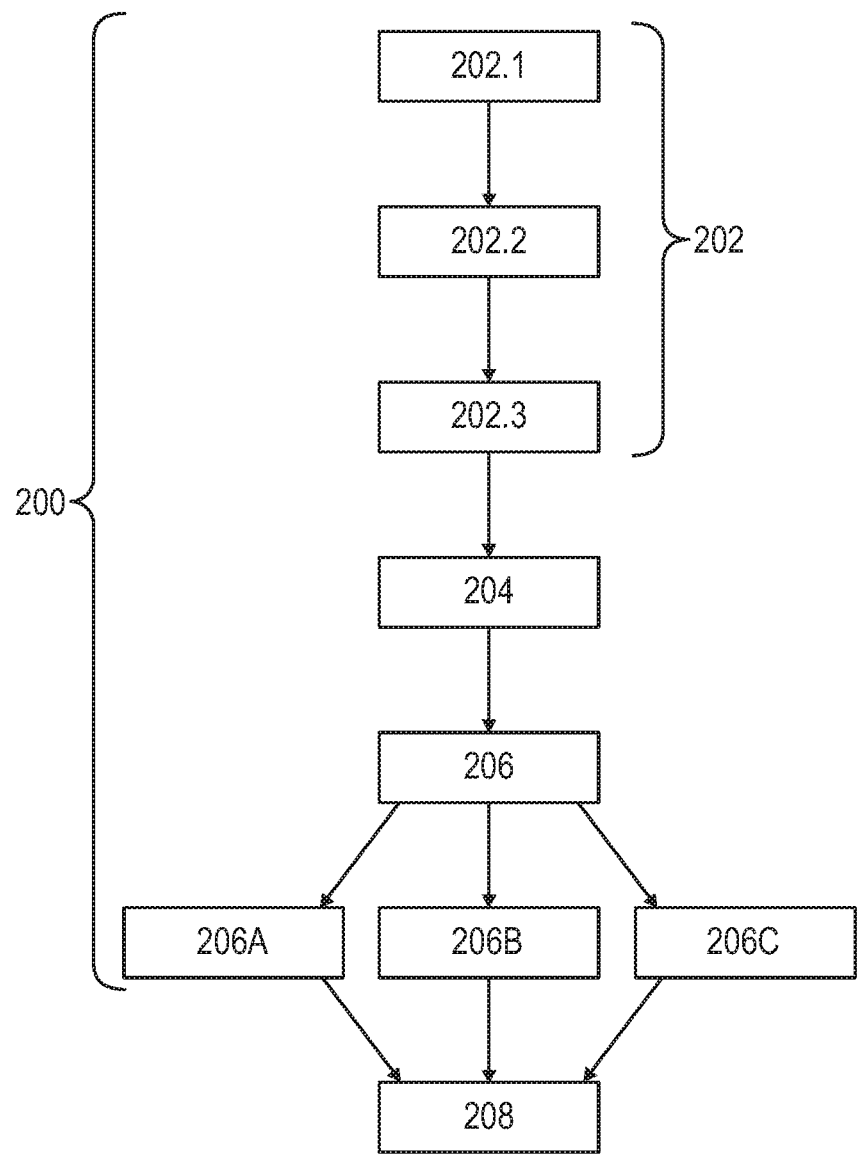
FIG. 12 is a schematic flow chart of the transport conversion mode as automatically implemented by the controller.

The controller 78 includes in its software 116 a transport conversion mode 200, one example of which is schematically illustrated in the flow chart of FIG. 12.

Transport conversion mode 200 includes step 202 of spinning the frame in place on the ground through a re-orientation angle. Step 202 may include the movement of the paving machine 10 from the position of FIG. 4.1 to the position of FIG. 4.8.

Step 202 may include sub-steps 202.1-202.3. Step 202.1 may include beginning with the frame in a paving orientation with the swing legs and the ground engaging units oriented primarily in the paving direction. Step 202.2 may include rotating each of the ground engaging units relative to its respective swing leg until each of the ground engaging units is in a spinning orientation transverse to its respective swing leg. Step 202.3 may include synchronously driving at least two of the ground engaging units and thereby spinning the frame on the ground through the re-orientation angle without pivoting any of the swing legs relative to the frame during the spinning.

Step 204 may include after step 202, rotating each of the ground engaging units relative to its respective swing leg until each ground engaging unit is primarily oriented in a transport direction generally perpendicular to the paving direction. Step 204 may include movement of the paving machine 10 from the position of FIG. 4.8 to the position of FIG. 4.9.

The controller may be pre-programmed to utilize only one of the "Swing Over Steering" technique, the "Selective Braking And/Or Differential Speed" technique, and the "Steer Over Swinging" technique, or the controller may be programmed to allow the human operator to select one of the "Swing Over Steering" technique, the "Selective Braking And/Or Differential Speed" technique, and the "Steer Over Swinging" technique. In step 206, a determination is made of which technique is to be implemented.

If the "Swing Over Steering" technique is to be used, the next step of the transport conversion mode 200 is step 206A, which may include steering at least one ground engaging unit while moving the paving machine in the transport direction and with the respective swing leg associated with the at least one ground engaging unit being unlocked relative to the frame so that the respective swing leg pivots relative to the frame in response to the steering of the at least one ground engaging unit.

If the "Selective Braking And/Or Differential Speed" technique is used, the next step of the transportation conversion mode 200 after step 204 is step 206B, which may include retarding at least one ground engaging unit while moving the paving machine in the transport direction and with the respective swing leg associated with the at least one ground engaging unit being unlocked relative to the frame so that the respective swing leg pivots relative to the frame in response to the retarding of the at least one ground engaging unit.

If the "Steer Over Swinging" technique is used, the next step of the transportation conversion mode 200 after step 204 is step 206C which may include maintaining the ground engaging units always oriented in the transport direction while the swing legs are pivoting.

Any of the steps 206A, 206B or 206C may include movement of the paving machine 10 from the position of FIG. 4.9 to the position of FIG. 4.19.

After step 206A, 206B or 206C, when the position of FIG. 4.19 has been achieved, the step 208 of driving the paving machine onto the transport vehicle 25 may be performed. Step 208 is preferably manually controlled by the human operator of the paving machine 10.

The transport conversion mode 200 may be selected by pressing the control button 126 as seen in FIG. 8. The transport conversion mode 200 may be implemented in either a manual sub-mode or an automatic sub-mode.

Upon initiation of the transport conversion mode 200 upon pressing of button 126, the transport conversion mode 200 will be in the manual sub-mode, unless the automatic sub-mode is selected by further inputs to the control panel 112.

In the manual sub-mode, the transport conversion mode 200 may allow the human operator to control step 202 of the spinning of the machine frame through the re-orientation angle from the position of FIG. 4.2 to the position of FIG. 4.8 by input to rotational control knob 132. Then steps 204 and 206 may be automatically controlled.

In the manual sub-mode, when using the "Swing Over Steering" technique of FIG. 5 to control the pivoting of the swing arms, the human operator may be allowed to manually control the steering of one of the ground engaging units, such as ground engaging unit 16B, and the controller 78 may automatically perform the remaining actions.

In the automatic sub-mode, the transport conversion mode 200 automatically causes the controller 78 to send control signals to carry out all of the steps 202, 204 and 206, using any of the selected techniques of "Swing Over Steering", the "Selective Braking And/Or Differential Speed" or "Steer Over Swinging". If the human operator observes a problem as the re-orientation process 200 is being performed, the automatic process may be stopped by hitting an emergency stop button 134.

During any of the re-orientation operations described above using the embodiment of FIG. 3 or FIG. 3A, when the swing legs are being pivoted the associated hydraulic rams 40 may be placed in an unblocked position. This unblocked position may be described as deactivating the hydraulic rams or linear actuators, or as unlocking the hydraulic rams, so that the hydraulic rams do not resist the pivotal motion of the associated swing leg relative to the machine frame. For example, in the embodiment of FIG. 7, hydraulic ram 40A may be placed in an unblocked position by closing three way valve 70A and opening the bypass valves 71A and 73A. Alternatively the hydraulic rams or linear actuators 40 may be disconnected.

After the re-orientation operation is complete and the swing legs are in the desired final positions, the associated hydraulic rams 40 may be activated by placing each hydraulic ram in a blocked position to hold or lock the associated swing leg in the revised pivotal position. For example, in the embodiment of FIG. 7, the hydraulic ram 40A may be placed in the blocked position by closing three way valve 70A and closing the bypass valves 71A and 73A. Alternatively, if the hydraulic rams or linear actuators were disconnected, they may be reconnected after the re-orientation operation is complete.

Alternatively, in the embodiment of FIG. 7, during the re-orientation operation the hydraulic ram 40 may be placed in one of the activated positions 88 or 96 to retract or extend the piston 94 so as to actively facilitate the pivotal motion of the associated swing leg relative to the machine frame. To accomplish such active facilitation of the hydraulic ram 40A, the bypass valves 71A and 73A are placed in their closed positions, and the three way valve 70A is moved to either its position 88A or 96A. The flow rate of hydraulic fluid directed to the hydraulic ram 40 may be controlled by the three way valve 70.

The hydraulic ram 40A may be described as a first hydraulic actuator 40A connected between the machine frame 12 and the first swing leg 14A, and configured to change in length as the first swing leg 14A pivots relative to the machine frame 12. The valves associated with the first hydraulic actuator 40A can be switched so that the hydraulic actuator is in a hydraulically blocked position as described above preventing pivoting of the first swing leg 14A or a hydraulically unblocked position as described above permitting pivoting of the first swing leg 14A.

The controller 78 may be configured such that the hydraulic actuator or ram 40 associated with each swing leg 14 to be pivoted is placed in an unblocked position prior to pivoting of the swing leg 14.

The controller 78 may be configured such that upon deactivation of the swing leg pivot mode, the valves associated with the hydraulic actuators or rams 40 are in their blocked positions.

Thus it is seen that the apparatus and methods of the present invention readily achieve the ends and advantages mentioned as well as those inherent therein. Although certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A method of preparing a paving machine for transport, the paving machine including:
   a frame including a rear and a front, the frame defining a paving direction extending from the rear to the front, and the frame defining a transport direction perpendicular to the paving direction;
   a plurality of swing legs pivotally connected to the frame; and
   a plurality of ground engaging units, one ground engaging unit being steerably connected to each one of the swing legs, each of the ground engaging units including a drive such that the ground engaging unit may be driven across the ground;
   the method comprising the steps of:
   (a) spinning the frame in place on the ground through a re-orientation angle;
   (b) after step (a), rotating each of the ground engaging units relative to its respective swing leg until each ground engaging unit is oriented primarily in the transport direction; and
   (c) while moving the paving machine in the transport direction, pivoting each of the swing legs relative to the frame until each swing leg is oriented primarily in the transport direction.

2. The method of claim 1, wherein:
   in step (a) the re-orientation angle is substantially 90 degrees.

3. The method of claim 1, wherein;
   step (a) is performed without pivoting any of the swing legs relative to the frame during the spinning.

4. The method of claim 1, wherein step (a) further comprises:
   beginning with the frame in a paving orientation with the swing legs and the ground engaging units oriented primarily in the paving direction;
   rotating each of the ground engaging units relative to its respective swing leg until each of the ground engaging units is in a spinning orientation transverse to its respective swing leg; and
   synchronously driving at least two of the ground engaging units and thereby spinning the frame on the ground through the re-orientation angle without pivoting any of the swing legs relative to the frame during the spinning.

5. The method of claim 1, wherein:
   prior to step (a) the paving machine is located in a roadway, with the paving machine in a paving orientation facing forward along a length of the roadway, and with a transport vehicle located in the roadway ahead of the paving machine, the transport vehicle being aligned with the length of the roadway; and
   the frame has a left side and a right side defining a frame width between the left side and the right side; and
   in step (a) the re-orientation angle is about 90 degrees so that at the end of step (a) the frame width is generally aligned with the length of the roadway.

6. The method of claim 5, further comprising:
   after step (c), advancing one or more of the ground engaging units so that the frame advances in the transport direction onto the transport vehicle.

7. The method of claim 1, further comprising:
   after step (c), advancing one or more of the ground engaging units so that the frame advances in the transport direction onto a transport vehicle;
   transporting the paving machine to a new location;
   driving the paving machine in a reverse transport direction off of the transport vehicle at the new location onto a roadway;
   moving the paving machine along the roadway and while moving the paving machine along the roadway pivoting each of the swing legs relative to the frame until each swing leg is oriented primarily in the paving direction relative to the frame; and
   spinning the frame in place on the ground through a second re-orientation angle of about 90 degrees until the frame extends across a width of the roadway.

8. The method of claim 1, wherein:
   at least step (c) is performed under control of an automatic controller.

9. The method of claim 8, wherein:
   step (b) is also performed under control of the automatic controller.

10. The method of claim 9, wherein:
    step (a) is also performed under control of the automatic controller.

11. The method of claim 1, wherein for each associated swing leg and ground engaging unit, step (b) is performed before step (c).

12. The method of claim 1, wherein:
    step (c) includes steering at least one ground engaging unit while moving the paving machine in the transport direction and with the respective swing leg associated with the at least one ground engaging unit being unlocked relative to the frame so that the respective swing leg pivots relative to the frame in response to the steering of the at least one ground engaging unit.

13. The method of claim 12, wherein:
    step (c) includes moving the paving machine to and fro in opposite transport directions.

14. The method of claim 1, wherein:
    step (b) further comprises maintaining the swing legs fixed relative to the frame while rotating each of the ground engaging units relative to its respective swing leg until all of the ground engaging units are oriented primarily in the transport direction.

15. The method of claim 1, wherein:
step (c) includes retarding at least one ground engaging unit while moving the paving machine in the transport direction and with the respective swing leg associated with the at least one ground engaging unit being unlocked relative to the frame so that the respective swing leg pivots relative to the frame in response to the retarding of the at least one ground engaging unit.

16. The method of claim 1, wherein for each associated swing leg and ground engaging unit, during step (c) the respective ground engaging unit is always oriented in the transport direction.

17. The method of claim 16, wherein:
step (c) is performed under the control of an automatic controller, the automatic controller monitors a pivot angle of each swing leg relative to the frame, and the automatic controller controls a steering angle of each ground engaging unit relative to its respective swing leg to maintain the ground engaging units always oriented in the transport direction during pivoting of the swing legs.

18. A paving machine, comprising:
a frame including a rear and a front, the frame defining a paving direction extending from the rear to the front and a transport direction perpendicular to the paving direction;
a plurality of swing legs pivotally connected to the frame;
a plurality of ground engaging units, one ground engaging unit being steerably connected to each one of the swing legs, each of the ground engaging units including a drive such that the ground engaging unit may be driven across the ground; and
an automatic controller having a transport conversion mode in which the controller is configured to:
(a) cause the frame to spin in place on the ground through a re-orientation angle;
(b) then rotate each of the ground engaging units relative to its respective swing leg until each ground engaging unit is primarily oriented in the transport direction; and
(c) move the paving machine in the transport direction, and while moving in the transport direction pivot each of the swing legs relative to the frame until each swing leg is oriented primarily in the transport direction.

19. The paving machine of claim 18, wherein the re-orientation angle is substantially 90 degrees.

20. The paving machine of claim 18, wherein the automatic controller is further configured such that the spin of element (a) is performed without pivoting any of the swing legs relative to the frame during the spin.

21. The paving machine of claim 18, wherein the automatic controller is further configured such that the spin of element (a) includes:
beginning with the frame in a paving orientation with the swing legs and the ground engaging units oriented primarily in the paving direction;
rotating each of the ground engaging units relative to its respective swing leg until each of the ground engaging units is in a spinning orientation transverse to its respective swing leg; and
synchronously driving at least two of the ground engaging units and thereby spinning the frame on the ground through the re-orientation angle without pivoting any of the swing legs relative to the frame during the spinning.

22. The paving machine of claim 18, wherein the automatic controller is further configured such that element (c) includes steering at least one ground engaging unit while moving the paving machine in the transport direction and with the respective swing leg associated with the at least one ground engaging unit being unlocked relative to the frame so that the respective swing leg pivots relative to the frame in response to the steering of the at least one ground engaging unit.

23. The paving machine of claim 22, wherein the automatic controller is further configured such that element (c) includes moving the paving machine to and fro in opposite transport directions.

24. The paving machine of claim 18, wherein the automatic controller is further configured such that element (b) includes maintaining the swing legs fixed relative to the frame while rotating each of the ground engaging units relative to its respective swing leg until all of the ground engaging units are oriented primarily in the transport direction.

25. The paving machine of claim 18, wherein the automatic controller is further configured such that element (c) includes retarding at least one ground engaging unit while moving the paving machine in the transport direction and with the respective swing leg associated with the at least one ground engaging unit being unlocked relative to the frame so that the respective swing leg pivots relative to the frame in response to the retarding of the at least one ground engaging unit.

26. The paving machine of claim 18, wherein the automatic controller is further configured such that element (c) includes keeping the ground engaging units always oriented in the transport direction.

27. The paving machine of claim 26, wherein element (c) includes the automatic controller being configured to monitor a pivot angle of each swing leg relative to the frame and to control a steering angle of each ground engaging unit relative to its respective swing leg to maintain the ground engaging units always oriented in the transport direction during pivoting of the swing legs.

* * * * *